(12) United States Patent
Nakao et al.

(10) Patent No.: US 11,112,285 B2
(45) Date of Patent: Sep. 7, 2021

(54) FLOW MEASUREMENT DEVICE, FLOW MEASUREMENT METHOD, AND FLOW MEASUREMENT PROGRAM

(71) Applicant: OMRON Corporation, Kyoto (JP)

(72) Inventors: Hideyuki Nakao, Kusatsu (JP); Katsuyuki Yamamoto, Kusatsu (JP); Kenichi Handa, Takatsuki (JP); Ryuhei Goto, Takatsuki (JP)

(73) Assignee: OMRON Corporation, Kyoto (JP)

( * ) Notice: Subject to any disclaimer, the term of this patent is extended or adjusted under 35 U.S.C. 154(b) by 504 days.

(21) Appl. No.: 15/901,053

(22) Filed: Feb. 21, 2018

(65) Prior Publication Data
US 2018/0180455 A1    Jun. 28, 2018

Related U.S. Application Data

(63) Continuation of application No. PCT/JP2016/087636, filed on Dec. 16, 2016.

(30) Foreign Application Priority Data

Jan. 20, 2016  (JP) .............................. JP2016-009192

(51) Int. Cl.
*G01F 1/684*  (2006.01)
*G01F 5/00*  (2006.01)
(Continued)

(52) U.S. Cl.
CPC ................ *G01F 1/684* (2013.01); *G01F 5/00* (2013.01); *G01N 25/18* (2013.01); *G01P 5/10* (2013.01)

(58) Field of Classification Search
CPC ... G01F 1/684; G01F 5/00; G01F 1/86; G01F 25/0007; G01N 25/18; G01P 5/10; G01K 13/02
(Continued)

(56) References Cited

U.S. PATENT DOCUMENTS 4,677,850 A  *  7/1987  Miura ..................... G01F 1/684
                                                  73/204.15
7,503,903 B2 *  3/2009  Carlisle ............... A61M 5/1408
                                                  604/246
(Continued)

FOREIGN PATENT DOCUMENTS

EP           2703786 A1      3/2014
EP           2816328 A1     12/2014
(Continued)

OTHER PUBLICATIONS

An English translation of the International Search Report of PCT/JP2016/087636 dated Jan. 17, 2017.
(Continued)

*Primary Examiner* — Jeffrey P Aiello
(74) *Attorney, Agent, or Firm* — Metrolex IP Law Group, PLLC

(57) ABSTRACT

A flow measurement device includes a flow sensor that senses a flow rate of a measurement target fluid flowing through a main channel, a characteristic-value obtaining unit that includes a heater heating the target fluid and a temperature sensor sensing a temperature of the target fluid, and obtains a characteristic value of the target fluid, and a flow rate correction unit that corrects a flow rate of the target fluid calculated based on a sensing signal from the flow sensor using the characteristic value of the target fluid obtained by the characteristic-value obtaining unit. The heater and the temperature sensor are arranged parallel to each other in a direction orthogonal to a flow direction of the target fluid. The characteristic-value obtaining unit obtains the characteristic value based on a difference between the temperatures of the target fluid sensed by the temperature sensor before and after the heater temperature is changed.

14 Claims, 20 Drawing Sheets

(51) Int. Cl.
*G01P 5/10* (2006.01)
*G01N 25/18* (2006.01)

(58) Field of Classification Search
USPC .............. 73/152.33, 202.5, 204.11; 324/105; 702/45, 50, 100, 130, 182
See application file for complete search history.

(56) References Cited

U.S. PATENT DOCUMENTS

| | | | | |
|---|---|---|---|---|
| RE40,806 E | * | 6/2009 | Gradon | G08B 21/16 128/203.17 |
| 2006/0239328 A1 | * | 10/2006 | Sumi | G01N 25/18 374/43 |
| 2007/0255199 A1 | * | 11/2007 | Dewey | A61M 5/14224 604/67 |
| 2011/0028937 A1 | * | 2/2011 | Powers | A61M 5/14224 604/500 |
| 2014/0069205 A1 | * | 3/2014 | Yamamoto | G01F 1/684 73/861.02 |
| 2014/0148757 A1 | * | 5/2014 | Ambrosina | A61M 5/38 604/67 |
| 2014/0373621 A1 | | 12/2014 | Schirm | |
| 2015/0143869 A1 | * | 5/2015 | Booker | F02D 41/1445 73/1.29 |
| 2015/0316401 A1 | | 11/2015 | Popp et al. | |

FOREIGN PATENT DOCUMENTS

| | | | |
|---|---|---|---|
| JP | 2004-257789 A | | 9/2004 |
| JP | 2004257789 A | * | 9/2004 |
| JP | 2012-233776 A | | 11/2012 |
| JP | 5652315 B2 | * | 1/2015 |
| JP | 5652315 B2 | | 1/2015 |
| WO | 2014/090557 A1 | | 3/2019 |

OTHER PUBLICATIONS

An English translation of the Written Opinion of PCT/JP2016/087636 dated Jan. 17, 2017.
The Extended European search report dated Mar. 4, 2019 in a counterpart European patent application.

* cited by examiner

FLOW MEASUREMENT DEVICE, FLOW MEASUREMENT METHOD, AND FLOW MEASUREMENT PROGRAM

CROSS REFERENCE TO RELATED APPLICATIONS

This application is a continuation application of International Application No. PCT/JP2016/087636, filed on Dec. 16, 2016, which claims priority based on the Article 8 of Patent Cooperation Treaty from prior Japanese Patent Application No. 2016-009192, filed on Jan. 20, 2016, the entire contents of which are incorporated herein by reference.

FIELD

The disclosure relates to a flow measurement device, a flow measurement method, and a flow measurement program.

BACKGROUND

Flow measurement devices are known to include a heater and a temperature sensor and measure the flow rate of a measurement target fluid. For example, Patent Literature 1 describes a flow measurement device including a physical property sensor for sensing the physical properties of a measurement target fluid to reduce variations in output characteristics caused by changes in the physical properties of the measurement target fluid. More specifically, the temperature differences between a microheater and thermopiles are sensed to determine the thermal conductivity (thermal diffusion constant), and the flow rate measured by a sensor is then corrected based on the thermal conductivity.

CITATION LIST

Patent Literature

Patent Literature 1: Japanese Unexamined Patent Application Publication No. 2012-233776

SUMMARY

Technical Problem

A technique has been developed to determine the thermal conductivity based on the temperature differences between a microheater and thermopiles and correct the flow rate of a measurement target fluid using the thermal conductivity. With a thermal flow sensor, the thermal diffusivity of the measurement target fluid also affects the sensor output. Thus, the technique known in the art may not accurately correct the flow rate depending on the gas.

One or more aspects are directed to improving the accuracy in measuring the flow rate of measurement target fluids having different thermal diffusivities.

Solution to Problem

A flow measurement device according to one aspect includes a flow sensor that senses a flow rate of a measurement target fluid flowing through a main channel, a characteristic-value obtaining unit that includes a heater for heating the measurement target fluid and a temperature sensor for sensing a temperature of the measurement target fluid, and obtains a characteristic value of the measurement target fluid, and a flow rate correction unit that corrects a flow rate of the measurement target fluid calculated based on a sensing signal output from the flow sensor using the characteristic value of the measurement target fluid obtained by the characteristic-value obtaining unit. The heater and the temperature sensor are arranged parallel to each other in a direction orthogonal to a flow direction of the measurement target fluid. The characteristic-value obtaining unit obtains the characteristic value based on a difference between the temperatures of the measurement target fluid sensed by the temperature sensor before and after a temperature of the heater is changed.

The characteristic value obtained based on the difference between the measurement target fluid temperatures sensed by the temperature sensor before and after the change in the heater temperature allows correction in accordance with the thermal diffusivity varying depending on, for example, the thermal conductivity, the specific heat, and the viscosity of the measurement target fluid. Thus, the flow rate of measurement target fluids having different thermal diffusivities can be measured with higher accuracy.

The characteristic value may be a value obtained by multiplying a predetermined coefficient by the difference between the temperatures of the measurement target fluid sensed by the temperature sensor before and after the temperature of the heater is changed. The flow rate correction unit may multiply the sensing signal output from the flow sensor by the characteristic value to correct the flow rate of the measurement target fluid. This value may be specifically used as a characteristic value.

The flow measurement device may further include a sub-channel section branching from the main channel and having one end continuous with a first inlet opening in the main channel and another end continuous with a first outlet opening in the main channel. The sub-channel section includes a characteristic-value sensing channel containing the temperature sensor included in the characteristic-value obtaining unit. The flow sensor may be at a position different from the characteristic-value sensing channel. The sub-channel section enables the device to measure the flow rate independently of the size of and the flow rate in the main channel. Additionally, the sub-channel section prevents dust from entering the flow sensor and the temperature sensor included in the characteristic-value obtaining unit.

Further, the temperature sensor included in the characteristic-value obtaining unit and the flow sensor may be included in a flow sensing member that is removably mounted on the main channel or a member defining the sub-channel section. This enables a component mountable to main channel sections with various flow rates and shapes, and reduces the costs.

Further, the sub-channel section may include a flow sensing channel containing the flow sensor, a first sub-channel section branching from the sub-channel section and having one end continuous with a first inlet opening in the main channel and another end continuous with a first outlet opening in the main channel, and a second sub-channel section branching from the first sub-channel section and having one end continuous with a second inlet opening in the first sub-channel section and another end continuous with a second outlet opening in the first sub-channel section. Each of the flow sensing channel and the characteristic-value sensing channel may further branch from the second sub-channel section and have one end continuous with a third inlet opening in the second sub-channel section and another end continuous with a third outlet opening in the second sub-channel section. This triple branching structure further reduces dust entering the flow sensor and the temperature sensor included in the characteristic-value obtaining unit.

The sub-channel section may further include a flow sensing channel containing the flow sensor. The flow sensing channel may have one end continuous with the first inlet and another end continuous with the first outlet. The device may allow the measurement target fluid flowing in through the first inlet to branch to the characteristic-value sensing channel and to the flow sensing channel. This specific branching structure may be used.

The sub-channel section may further include a flow sensing channel containing the flow sensor. The characteristic-value sensing channel may be located in the flow sensing channel. The device may allow part of the measurement target fluid flowing through the flow sensing channel to flow into the characteristic-value sensing channel. This specific branching structure may be used.

The sub-channel section may further include a flow sensing channel containing the flow sensor. The flow sensing channel may have one end continuous with a fourth inlet opening in the main channel and another end continuous with a fourth outlet opening in the main channel. This specific branching structure may be used.

The flow sensor may be located in the main channel. In this manner, the flow sensor may measure a fluid in the main channel.

The heater may be located to have a longitudinal direction in the flow direction of the measurement target fluid. The heater located in this manner can heat the measurement target fluid over a wide range in the flow direction of the measurement target fluid.

The temperature sensor may be located to have a longitudinal direction in the flow direction of the measurement target fluid. The temperature sensor located in this manner can sense the temperature over a wide range in the flow direction of the measurement target fluid.

The sub-channel section may further include a flow sensing channel containing the flow sensor. The flow sensing channel and the characteristic-value sensing channel may be defined by the sub-channel section or a channel branching from the sub-channel section separated by a circuit board located in parallel with the flow direction of the measurement target fluid in the sub-channel section or the channel branching from the sub-channel section. The flow sensor may be located on a first surface of the circuit board and the temperature sensor included in the characteristic-value obtaining unit is located on a second surface of the circuit board opposite to the first surface. This specific branching structure may be used.

The aspects described above may be combined to the extent possible without departing from the objects and the technical idea of the present invention. The flow measurement device described above may be embodied as a method or a program implemented by a processor or a microcontroller.

Advantageous Effects

One or more aspects improve the accuracy in measuring the flow rate of measurement target fluids having different thermal diffusivities.

DETAILED DESCRIPTION

A flow measurement device according to one or more embodiments will now be described with reference to the drawings. One or more embodiments described below is an example of a flow measurement device. The flow measurement device according to one or more embodiments is not limited to the structure described below.

Device Structure

Figure 1:
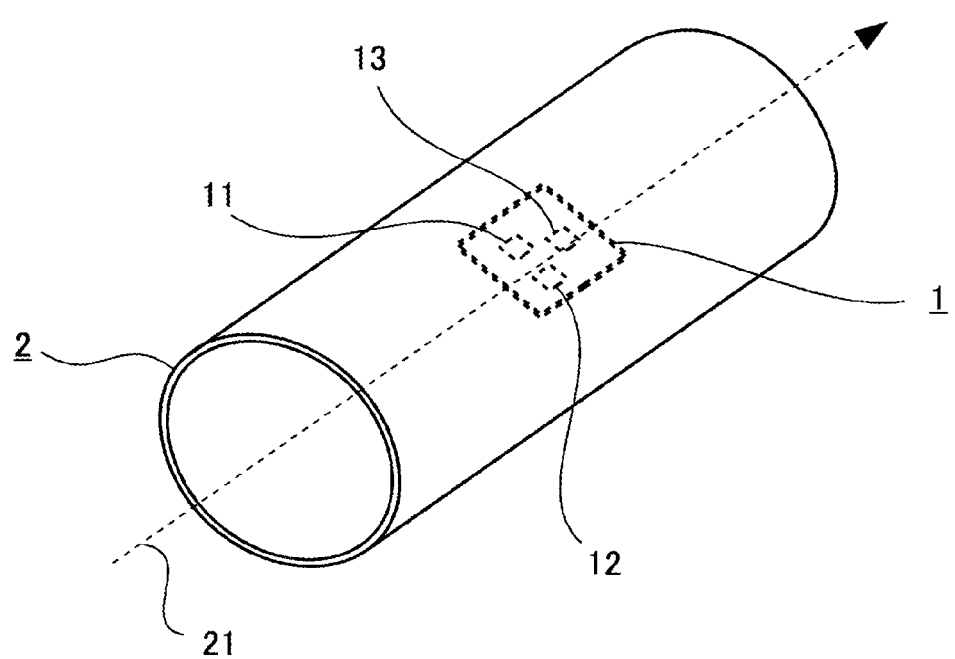
FIG. 1 is a perspective view of a flow measurement device illustrating its structure.
Figure 2:
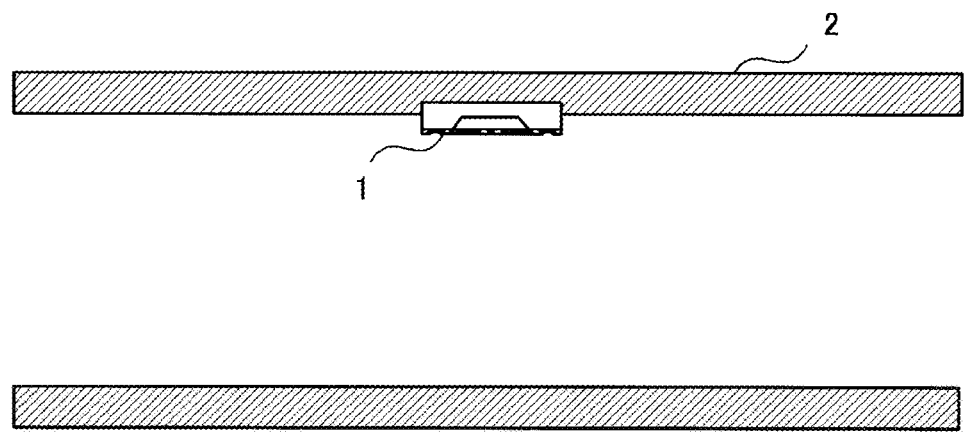
FIG. 2 is a longitudinal cross-sectional view illustrating a flow measurement device.
Figure 3:
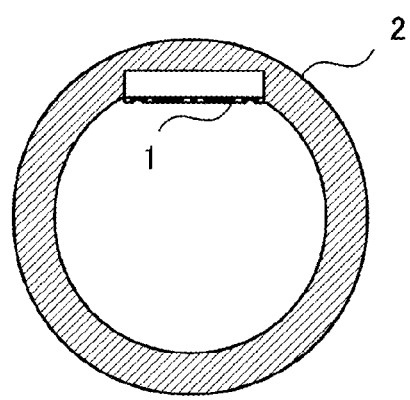
FIG. 3 is a cross-sectional view illustrating a flow measurement device.

FIG. 1 is a perspective view of the flow measurement device according to one or more embodiments showing its structure. FIG. 2 is a longitudinal cross-sectional view of the flow measurement device. FIG. 3 is a cross-sectional view of the flow measurement device. The flow measurement device is incorporated in, for example, a gas meter, a burning appliance, an automobile internal combustion engine, or a fuel cell, and measures the amount of gas flowing through a channel. In FIG. 1, a dashed arrow indicates the direction of a fluid flow. As shown in FIGS. 1 to 3, a flow measurement device 1 in one or more embodiments is installed inside a main channel section 2. The flow measurement device 1 includes a flow sensor 11, a physical property sensor (or temperature sensor) 12, and a control unit 13. The flow sensor 11 and the physical property sensor 12 are thermal flow sensors including a heater that is a microheater and temperature sensors that are thermopiles.

Figure 4:
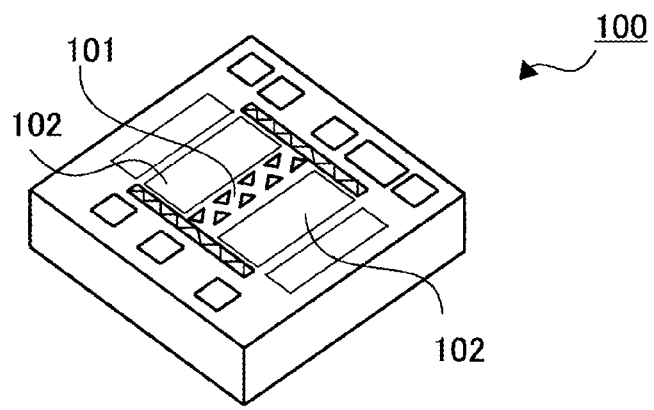
FIG. 4 is a perspective view illustrating an example sensor element used as a flow sensor and a physical property obtaining unit.
Figure 5A:
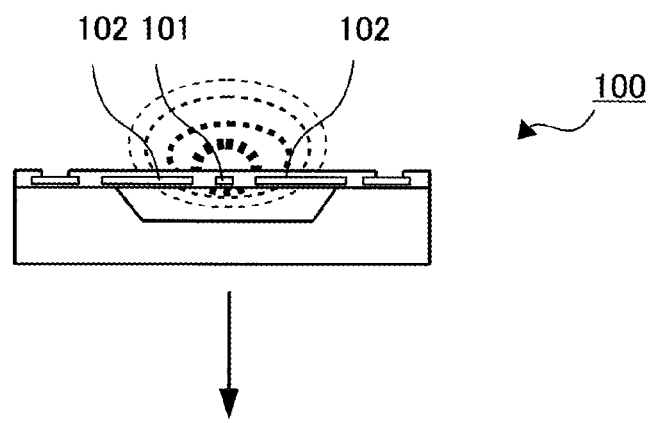
FIG. 5A is a cross-sectional view of a sensor element illustrating a mechanical configuration thereof.
Figure 5B:
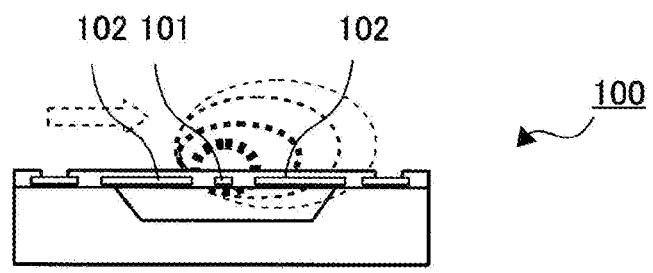
FIG. 5B is a cross-sectional view of a sensor element further illustrating a mechanical configuration thereof.

FIG. 4 is a perspective view of an example sensor element used as the flow sensor and the physical property obtaining unit. FIGS. 5A and 5B are cross-sectional views of the sensor element illustrating its mechanism. A sensor element 100 includes a microheater (heater) 101 and thermopiles (temperature sensors) 102 arranged on both sides of the microheater 101. These components are sandwiched between upper and lower insulating thin films, and mounted on a silicon base. The silicon base has a cavity (opening) under the microheater 101 and the thermopiles 102. The microheater 101 may be a polysilicon resistor. In FIGS. 5A and 5B, the microheater 101 generates heat with the temperature distribution schematically indicated by dashed ellipses, of which a thicker line indicates a higher temperature. With no airflow, the temperature distribution across the microheater 101 is substantially uniform as shown in FIG. 5A. With an airflow in, for example, the direction indicated by a dashed arrow in FIG. 5B, the ambient air moves and the temperature becomes higher on the leeward side of the microheater 101 than on the windward side. The sensor element outputs the flow rate value based on the bias in the distribution of the heat from the heater.

The control unit 13 in FIG. 1, which is an arithmetic unit such as a microcontroller, calculates the flow rate based on an output from the flow sensor 11, calculates a characteristic value of a predetermined physical property based on an output from the physical property sensor 12, and corrects the flow rate using the characteristic value.

Flow Sensor and Physical Property Obtaining Unit

Figure 6:
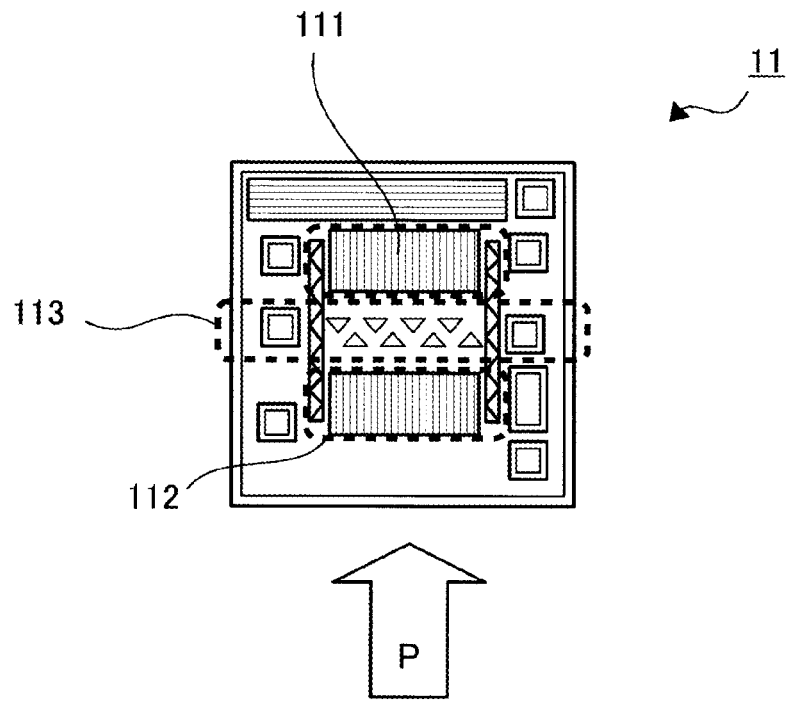
FIG. 6 is a schematic top view illustrating a flow sensor.
Figure 7:
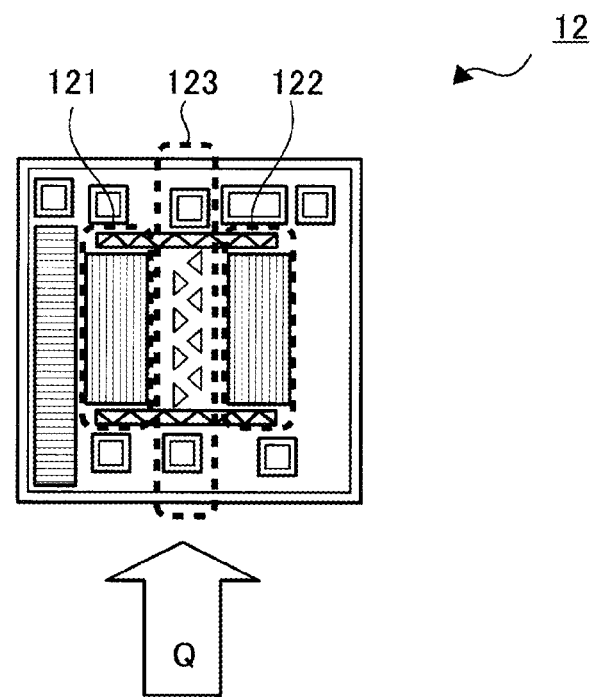
FIG. 7 is a schematic top view illustrating a physical property obtaining unit.

FIG. 6 is a schematic top view of the flow sensor 11 shown in FIG. 1. FIG. 7 is a schematic top view of the physical property sensor 12 shown in FIG. 1.

As shown in FIG. 6, the flow sensor 11 includes a first thermopile (flow-sensor first temperature sensor) 111 and a second thermopile (flow-sensor second temperature sensor) 112, which each sense the temperature of a measurement target fluid, and a microheater 113, which heats a measurement target fluid. The microheater 113, the flow-sensor first temperature sensor 111, and the flow-sensor second temperature sensor 112 are arranged parallel to one another inside the flow sensor 11 in flow direction P of the measurement target fluid. The microheater 113, the flow-sensor first temperature sensor 111, and the flow-sensor second temperature sensor 112 each are substantially rectangular as viewed from above, and have their longitudinal direction orthogonal to flow direction P of the target fluid.

The flow-sensor first temperature sensor 111 is located upstream from the microheater 113, and the flow-sensor second temperature sensor 112 is located downstream to sense the temperatures at symmetrical positions with respect to the microheater 113.

In the flow measurement device 1, the physical property sensor 12 and the flow sensor 11 have substantially the same sensor structure, and have 90-degree different orientations with respect to the flow direction of the measurement target fluid. One of the sensors with the same structure can thus function as the physical property sensor 12 and the other sensor can function as the flow sensor 11. This reduces the manufacturing costs for the flow measurement device 1.

As shown in FIG. 7, the physical property sensor 12 includes a first thermopile (physical-property-sensor first temperature sensor) 121 and a second thermopile (physical-property-sensor second temperature sensor) 122, which each sense the temperature of a measurement target fluid, and a microheater (physical-property-sensor heater) 123, which heats the measurement target fluid. The physical-property-sensor heater 123, the physical-property-sensor first temperature sensor 121, and the physical-property-sensor second temperature sensor 122 are arranged parallel to one another inside the physical property sensor 12 in the direction orthogonal to flow direction Q of the measurement target fluid. The physical-property-sensor heater 123, the physical-property-sensor first temperature sensor 121, and the physical-property-sensor second temperature sensor 122 each are substantially rectangular as viewed from above, and have their longitudinal direction in flow direction Q of the measurement target fluid. The physical-property-sensor first temperature sensor 121 and the physical-property-sensor second temperature sensor 122 are located symmetrically with respect to the physical-property-sensor heater 123 to sense the temperatures at symmetrical positions with respect to the physical-property-sensor heater 123.

The flow of the measurement target fluid biases the temperature distribution downstream, and thus a change in the temperature distribution in the direction orthogonal to the flow direction is smaller than a change in the temperature distribution in the flow direction of the measurement target fluid. Thus, the parallel arrangement of the physical-property-sensor first temperature sensor 121, the physical-property-sensor heater 123, and the physical-property-sensor second temperature sensor 122 in this order in the direction orthogonal to the flow direction of the measurement target fluid reduces a change in the output characteristics of the physical-property-sensor first temperature sensor 121 and the physical-property-sensor second temperature sensor 122 caused by a change in the temperature distribution. The temperature distribution change caused by the measurement target fluid flow can have less effect, thus improving the sensing accuracy of the physical property sensor 12.

With the physical-property-sensor heater 123 having its longitudinal direction in the flow direction of the measurement target fluid, the physical-property-sensor heater 123 can heat the measurement target fluid over a wide range in the flow direction of the measurement target fluid. Thus, with the temperature distribution biased downstream by the flow of a measurement target fluid, the physical-property-sensor first temperature sensor 121 and the physical-property-sensor second temperature sensor 122 have output characteristics with smaller changes. The temperature distribution change caused by the measurement target fluid flow can have less effect, thus improving the sensing accuracy of the physical property sensor 12.

Additionally, with the physical-property-sensor first temperature sensor 121 and the physical-property-sensor second temperature sensor 122 having their longitudinal directions in the flow direction of the measurement target fluid, the physical-property-sensor first temperature sensor 121 and the physical-property-sensor second temperature sensor 122 can sense the temperature over a wide range in the flow direction of the measurement target fluid. Thus, with the temperature distribution biased downstream by the flow of a measurement target fluid, the physical-property-sensor first temperature sensor 121 and the physical-property-sensor second temperature sensor 122 have output characteristics with smaller changes. The temperature distribution change caused by the measurement target fluid flow can have less effect, thus improving the sensing accuracy of the physical property sensor 12.

Functional Components

Figure 8:
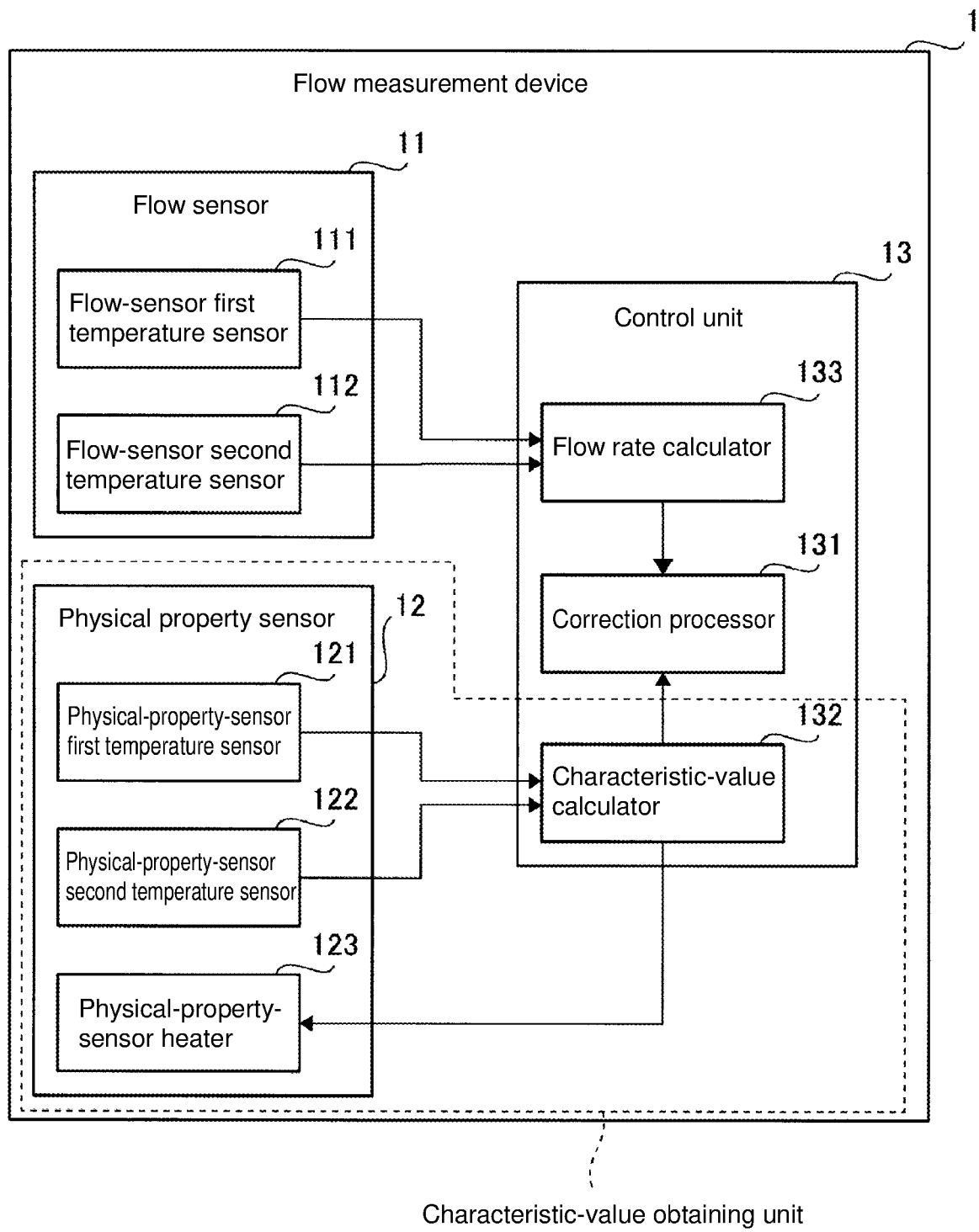
FIG. 8 is a functional block diagram illustrating a flow measurement device.

FIG. 8 is a functional block diagram of the flow measurement device. The flow measurement device 1 includes the flow sensor 11, the physical property sensor 12, and the control unit 13. The flow sensor 11 includes the flow-sensor first temperature sensor 111 and the flow-sensor second temperature sensor 112. The physical property sensor 12 includes the physical-property-sensor first temperature sensor 121, the physical-property-sensor second temperature sensor 122, and the physical-property-sensor heater 123.

The flow sensor 11 senses the flow rate of the measurement target fluid based on temperature sensing signals output from the flow-sensor first temperature sensor 111 and the flow-sensor second temperature sensor 112. More specifically, the flow sensor 11 calculates the difference between a temperature sensing signal output from the flow-sensor first temperature sensor 111 and a temperature sensing signal output from the flow-sensor second temperature sensor 112, and determines the flow rate value of the measurement target fluid based on the difference. The flow sensor 11 then outputs the flow rate value to the control unit 13.

The physical property sensor 12 outputs temperature sensing signals output from the physical-property-sensor first temperature sensor 121 and the physical-property-sensor second temperature sensor 122 to a characteristic-value calculator 132. More specifically, the physical property sensor 12 determines the average value of the temperature sensing signals output from the physical-property-sensor first temperature sensor 121 and the physical-property-sensor second temperature sensor 122. The physical-property-sensor heater 123 changes the temperature as controlled by, for example, the control unit 13. This allows the physical-property-sensor first temperature sensor 121 and the physical-property-sensor second temperature sensor 122 to determine output values obtained before and after the change in the temperature of the physical-property-sensor heater 123. The physical property sensor 12 outputs the determined output values to the control unit 13.

The control unit 13 includes a correction processor 131, the characteristic-value calculator 132, and a flow rate calculator 133. The flow rate calculator 133 calculates the flow rate of the measurement target fluid based on the sensing value received from the flow sensor 11. The characteristic-value calculator 132 calculates the characteristic value based on the sensing value received from the physical property sensor 12. More specifically, the characteristic-value calculator 132 changes the temperature of the microheater in the physical property sensor 12, and multiplies a predetermined coefficient by the difference between the measurement target fluid temperatures sensed by the thermopiles before and after the change to calculate the characteristic value. The correction processor 131 uses the characteristic value to correct the flow rate calculated by the flow rate calculator 133. The physical property sensor 12 and the characteristic-value calculator 132 are also collectively referred to as a characteristic-value obtaining unit.

Flow Measurement Process

Figure 9:
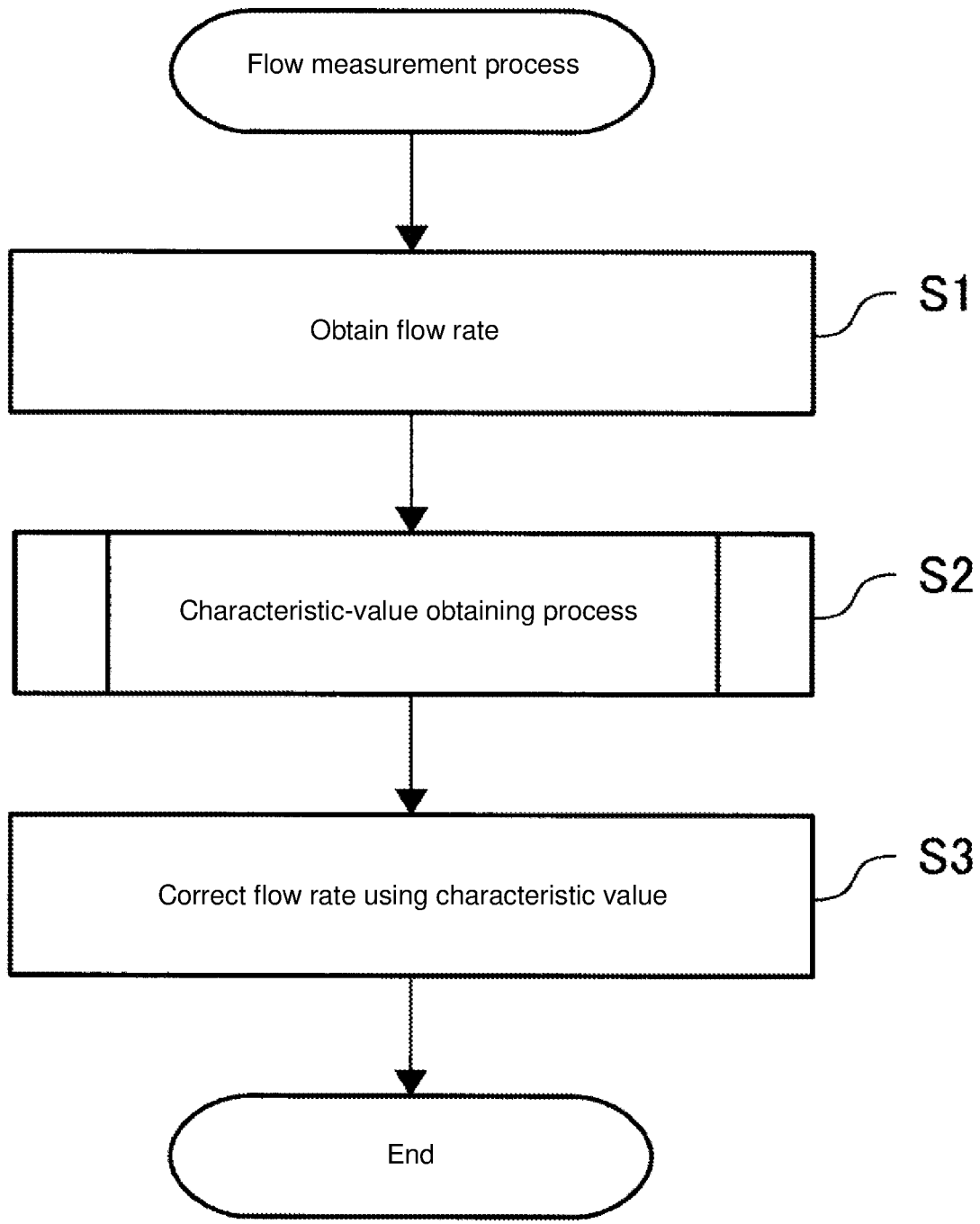
FIG. 9 is a flowchart illustrating an example flow measurement process.

FIG. 9 is a flowchart showing an example flow measurement process. As shown in FIG. 9, the flow sensor 11 outputs temperature sensing signals from the flow-sensor first temperature sensor 111 and the flow-sensor second temperature sensor 112, and the flow rate calculator 133 calculates the flow rate of the measurement target fluid based on the two temperature sensing signals (S1 in FIG. 9).

More specifically, the flow sensor 11 outputs a temperature sensing signal output from the flow-sensor first temperature sensor 111 and a temperature sensing signal output from the flow-sensor second temperature sensor 112. The flow rate calculator 133 calculates the difference between the two temperature sensing signals, and calculates the flow rate value of the measurement target fluid based on the difference.

Any known technique may be used to calculate the flow rate of the measurement target fluid based on the temperature sensing signals output from the flow-sensor first temperature sensor 111 and the flow-sensor second temperature sensor 112. The flow sensor 11 outputs the calculated flow rate of the measurement target fluid to the control unit 13.

The physical property sensor 12 performs a characteristic-value obtaining process (S2). The characteristic-value obtaining process will be described in detail with reference to FIG. 10.

Figure 10:
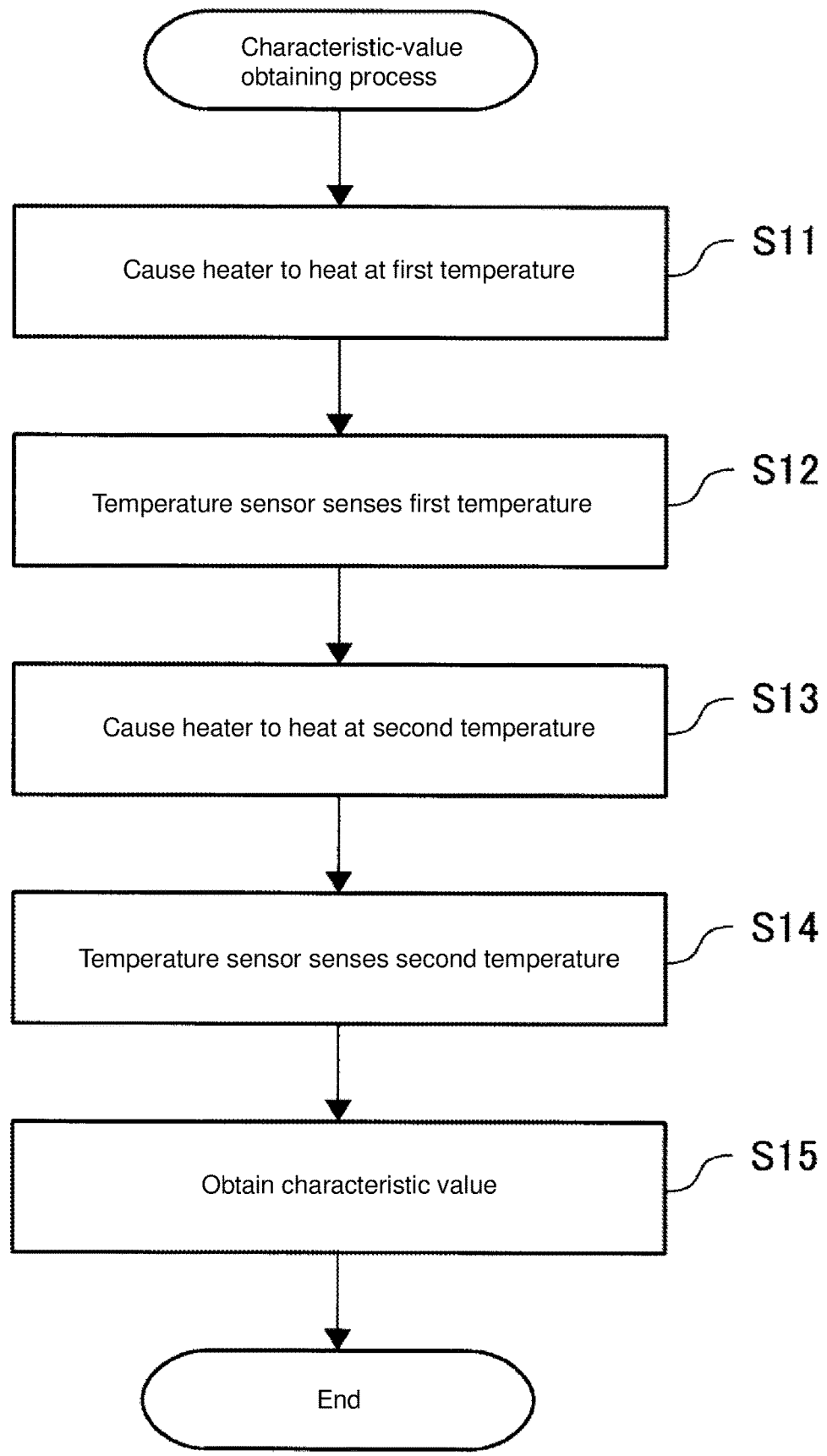
FIG. 10 is a flowchart illustrating an example characteristic-value obtaining process.

FIG. 10 is a flowchart showing an example characteristic-value obtaining process. The characteristic-value calculator 132 in the control unit 13 causes the physical-property-sensor heater 123 in the physical property sensor 12 to heat at a first temperature (S11 in FIG. 10). Subsequently, the physical-property-sensor first temperature sensor 121 and the physical-property-sensor second temperature sensor 122 in the physical property sensor 12 sense the first temperature (S12). This step may be performed as controlled by, for example, the control unit 13. The rate of heat transfer through a measurement target fluid is determined in accordance with the physical properties including thermal conductivity, thermal diffusivity, and specific heat. The temperature differences between the physical-property-sensor heater 123, and the physical-property-sensor first temperature sensor 121 and the physical-property-sensor second temperature sensor 122 can be sensed to determine the thermal conductivity. For example, as the temperature differences between the physical-property-sensor heater 123, and the physical-property-sensor first temperature sensor 121 and the physical-property-sensor second temperature sensor 122 increase, the thermal conductivity decreases. Using such characteristics in this step, the physical-property-sensor first temperature sensor 121 and the physical-property-sensor second temperature sensor 122 located in the direction orthogonal to the flow direction of the measurement target fluid sense the temperature of the measurement target fluid.

The characteristic-value calculator 132 in the control unit 13 then causes the physical-property-sensor heater 123 in the physical property sensor 12 to heat at a second temperature (S13). Subsequently, the physical-property-sensor first temperature sensor 121 and the physical-property-sensor second temperature sensor 122 in the physical property sensor 12 sense the second temperature (S14). This step may also be performed as controlled by, for example, the control unit 13. In this manner, the values are obtained to indicate the temperatures sensed by the physical-property-sensor first temperature sensor 121 and the physical-property-sensor second temperature sensor 122 before and after the change in the temperature of the physical-property-sensor heater 123.

The characteristic-value calculator 132 also calculates the characteristic value using the sensed temperatures (S15). In this step, the sensor sensitivity ratio is determined. The sensor sensitivity ratio is the ratio of the sensor output value obtained by flowing a predetermined gas to the sensor output value obtained by flowing a reference gas, and the characteristic value indicating the thermal diffusivity. The sensor sensitivity ratio α is determined using Formula 1 below.

$$\alpha = \beta \times \Delta T \quad (1)$$

In this formula, β is a predetermined coefficient, and ΔT is the difference between the sensing values output from the physical-property-sensor first temperature sensor 121 and the physical-property-sensor second temperature sensor 122 before and after the change in the temperature of the physical-property-sensor heater 123.

Referring back to the process shown in FIG. 9, the control unit 13 then corrects the flow rate of the measurement target fluid calculated by the flow rate calculator using the characteristic value (S3 in FIG. 9). More specifically, the control unit 13 calculates a corrected flow rate using Formula 2 below.

$$\text{Corrected output} = \text{Flow rate calculator output} \times \alpha \quad (2)$$

In one or more embodiments, a change in temperature (ΔT) sensed by the thermopiles when the heater temperature is changed may be used to determine the thermal diffusivity of the measurement target fluid. A flow rate output from a thermal flow sensor correlates with the thermal diffusivity. Thus, the flow rate correction process according to one or more embodiments enables appropriate correction for every gas. More specifically, the flow rate of measurement target fluids having different thermal diffusivities can be measured with higher accuracy.

Figure 11:
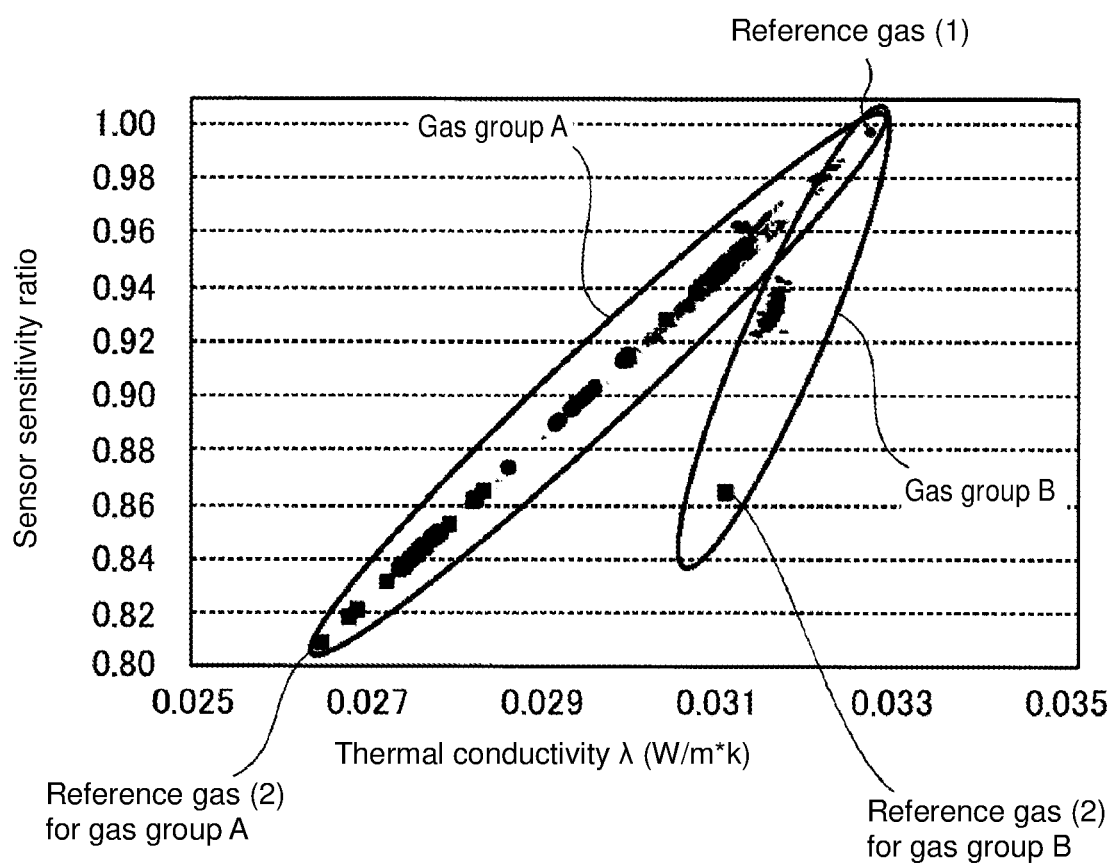
FIG. 11 is a graph illustrating the sensor sensitivity ratio on the vertical axis and thermal conductivity on the horizontal axis.

FIG. 11 is a graph showing the sensor sensitivity ratio on the vertical axis and thermal conductivity on the horizontal axis. For different gas groups having different physical properties other than thermal conductivity as shown in FIG. 11, for example, for mixed gases with different compositions, the thermal conductivity obtained as the physical property alone cannot be used to determine the sensor sensitivity ratio to be used for correction. In other words, the use of one set of a microheater heating temperature and a thermopile sensor temperature cannot allow appropriate correction for multiple gas groups based on two or more reference gases included in predetermined gas groups.

Figure 12:
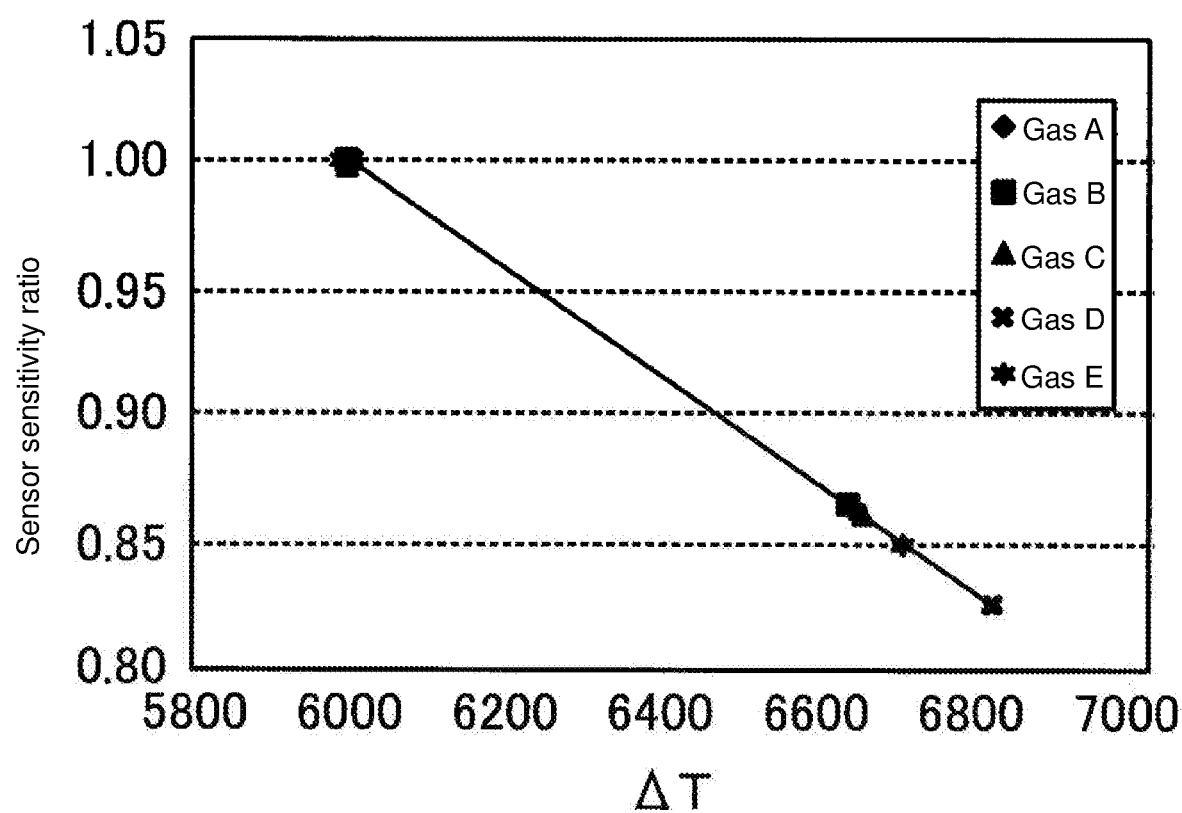
FIG. 12 is a graph illustrating the sensor sensitivity ratio on the vertical axis and the temperature difference $\Delta T$ on the horizontal axis.

FIG. 12 is a graph showing the sensor sensitivity ratio on the vertical axis and the temperature difference ΔT on the horizontal axis. For gases without linear approximation of the sensor sensitivity ratio and the thermal conductivity as shown in FIG. 11, the sensor sensitivity ratio and the temperature difference ΔT are linearly approximated. One or more embodiments thus allows correction for a gas group with an unknown thermal diffusivity.

Modifications

In one or more embodiments, the flow sensors in the flow measurement device 1 are designed to measure a fluid in the main channel section 2. However, the present invention is not limited to this structure. For example, the flow sensors in the flow measurement device 1 may be designed to measure a fluid in a sub-channel branching from the main channel section 2.

Figure 13A:
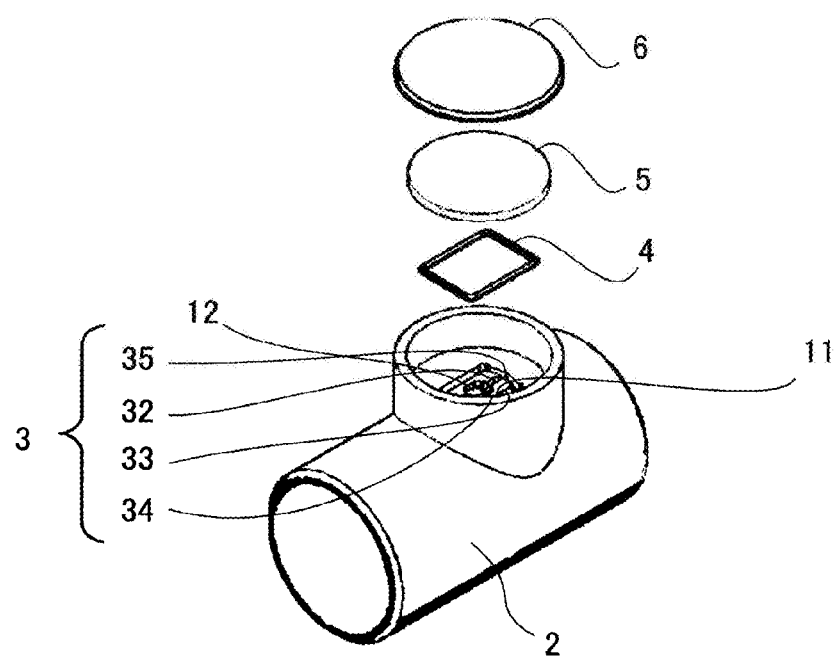
FIGS. 13A and 13B are diagrams illustrating a flow measurement device.
Figure 13B:
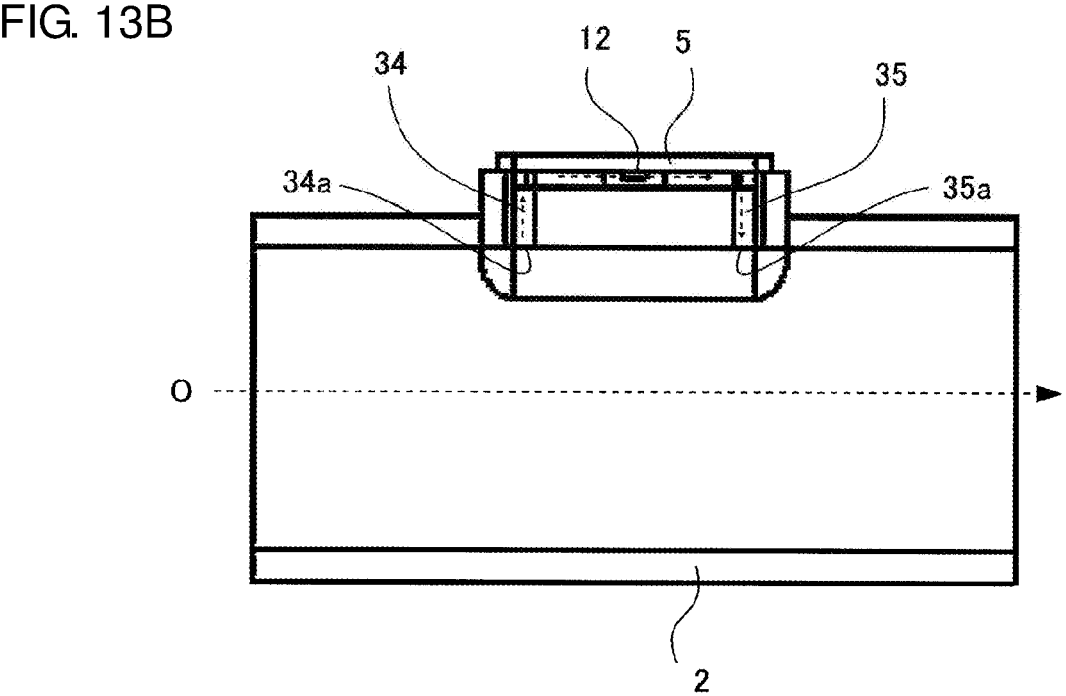

FIG. 13A is an exploded perspective view of a flow measurement device 1 according to one or more embodiments, and FIG. 13B is a cutaway view of the flow measurement device 1 shown in FIG. 13A. As shown in FIGS. 13A and 13B, the flow measurement device 1 according to this modification includes a main channel section 2, a sub-channel section 3, a seal 4, a circuit board 5, and a cover 6.

The main channel section 2 is a tubular member having a through-hole in the longitudinal direction. The inner surface of the main channel section 2 has an inlet (first inlet) 34a upstream from target fluid flow direction O, and an outlet (first outlet) 35a downstream.

In one or more embodiments, the main channel section 2 has an axial length of about 50 mm, an inner surface diameter (inside diameter of the main channel section 2) of about 20 mm, and an outer diameter of about 24 mm.

The sub-channel section 3 is located over the main channel section 2, and a sub-channel is formed inside and on the top surface of the sub-channel section 3. The sub-channel section 3 has one end continuous with the inlet 34a, and the other end continuous with the outlet 35a. The sub-channel section 3 in the flow measurement device 1 includes an in-flow channel 34, a physical property sensing channel 32, a flow sensing channel 33, and an out-flow channel 35.

The in-flow channel 34 is intended for taking in a measurement target fluid flowing through the main channel section 2, and allowing the measurement target fluid to branch to the physical property sensing channel 32 and to the flow sensing channel 33. The in-flow channel 34 extends through the sub-channel section 3 in the direction orthogonal to the main channel section 2. The in-flow channel 34 has one end continuous with the inlet 34a, and the other end open through the top surface of the main channel section 2 and continuous with the physical property sensing channel 32 and the flow sensing channel 33. This structure allows part of the measurement target fluid flowing through the main channel section 2 to branch to the physical property sensing channel 32 and to the flow sensing channel 33 via the in-flow channel 34.

The physical property sensing channel 32 has a longitudinal cross-section that is substantially squared U-shaped. The channel is formed on the top surface of the sub-channel section 3 and extends in the direction parallel to the main channel section 2. The physical property sensing channel 32 contains a physical property sensor 12 for sensing a physical property of the measurement target fluid in its longitudinally elongated part (in the direction parallel to the main channel section 2). The physical property sensing channel 32 has one end continuous with the inlet 34a via the in-flow channel 34, and the other end continuous with the outlet 35a via the out-flow channel 35.

The flow sensing channel 33 has a longitudinal cross-section that is substantially squared U-shaped. The flow sensing channel 33 is formed on the top surface of the sub-channel section 3 and extends in the direction parallel to the main channel section 2. The flow sensing channel 33 contains a flow sensor 11 for sensing the flow rate of the measurement target fluid in its longitudinally elongated part (in the direction parallel to the main channel section 2). The flow sensing channel 33 has one end continuous with the inlet 34a via the in-flow channel 34, and the other end continuous with the outlet 35a via the out-flow channel 35.

Although the physical property sensor 12 and the flow sensor 11 in the figure are separate from the circuit board 5 for ease of explanation, the physical property sensor 12 and the flow sensor 11 mounted on the circuit board 5 are located in the physical property sensing channel 32 and the flow sensing channel 33.

The out-flow channel 35 is intended for discharging the measurement target fluid that has passed through the physical property sensing channel 32 and the flow sensing channel 33 into the main channel section 2. The out-flow channel 35 extends through the sub-channel section 3 in the direction orthogonal to the main channel section 2. The out-flow channel 35 has one end continuous with the outlet 35a, and the other end open through the top surface of the main channel section 2 and continuous with the physical property sensing channel 32 and the flow sensing channel 33. This structure allows the measurement target fluid that has passed through the physical property sensing channel 32 and the flow sensing channel 33 to be discharged into the main channel section 2 via the out-flow channel 35.

In this manner, the measurement target fluid taken in through the same inlet 34a branches to the physical property sensing channel 32 and to the flow sensing channel 33 to enable the physical property sensor 12 and the flow sensor 11 to sense the physical property and the flow rate based on the measurement target fluid flowing under the same conditions including temperature and concentration. This improves the measurement accuracy of the flow measurement device 1.

In the flow measurement device 1, the seal 4 is fitted in the sub-channel section 3, and then the circuit board 5 is placed. The circuit board 5 is fixed to the sub-channel section 3 with the cover 6. This structure hermetically seals the inside of the sub-channel section 3.

Figure 14:
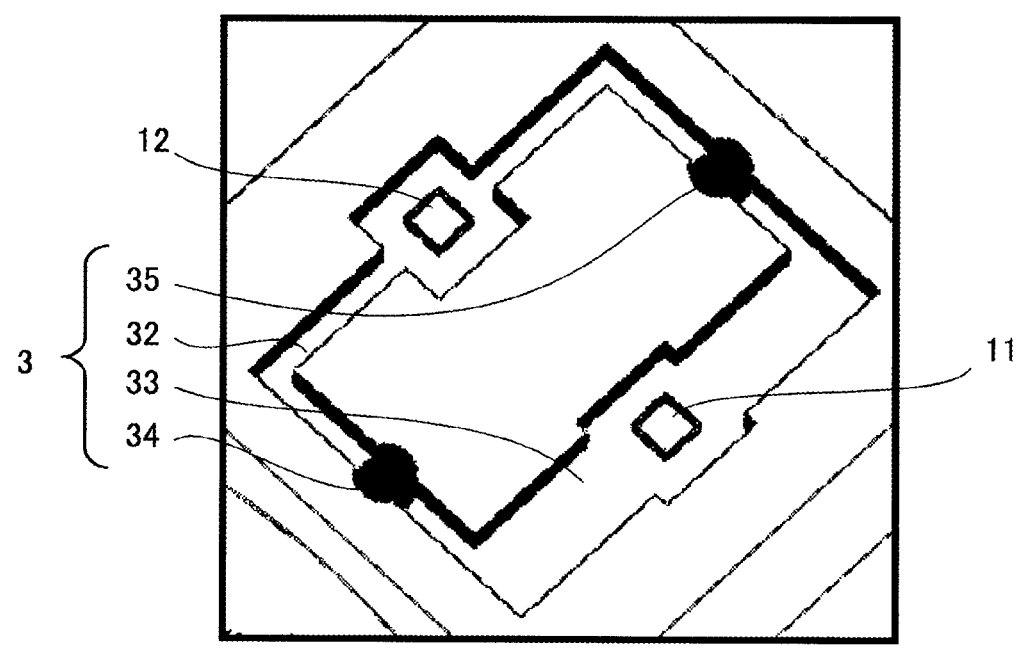
FIG. 14 is a perspective view illustrating a sub-channel section.

FIG. 14 is a perspective view of the sub-channel section 3 shown in FIG. 13A. As shown in FIG. 14, the physical property sensing channel 32 has one end that is substantially squared U-shaped continuous with the in-flow channel 34, and the other end continuous with the out-flow channel 35. Similarly, the flow sensing channel 33 has one end that is substantially squared U-shaped continuous with the in-flow channel 34, and the other end continuous with the out-flow channel 35.

The physical property sensing channel 32 and the flow sensing channel 33 are also continuous with each other at both their ends. The physical property sensing channel 32 and the flow sensing channel 33 define a rectangular channel on the top surface of the sub-channel section 3.

In the flow measurement device 1, the physical property sensing channel 32 and the flow sensing channel 33 each have a square area as viewed in the direction orthogonal to the top surface of the sub-channel section 3. These areas are located symmetrically with respect to the line connecting the in-flow channel 34 and the out-flow channel 35.

In one or more embodiments, each side of the physical property sensing channel 32 and the flow sensing channel 33 has a length of about 4 mm.

Although the physical property sensing channel 32 and the flow sensing channel 33 in one or more embodiments each have a square area, the present invention is not limited to this. The physical property sensing channel 32 and the flow sensing channel 33 may have any shape that may contain the physical property sensor 12 or the flow sensor 11 and may have the shape determined by the shapes of the physical property sensor 12 and the flow sensor 11 to be mounted.

When, for example, the physical property sensor 12 is smaller than the width of the physical property sensing channel 32, the physical property sensing channel 32 may have the same width as the physical property sensor 12. In this case, the longitudinally elongated part of the physical property sensing channel 32 is linear. The same applies to the flow sensing channel 33.

Figure 15A:
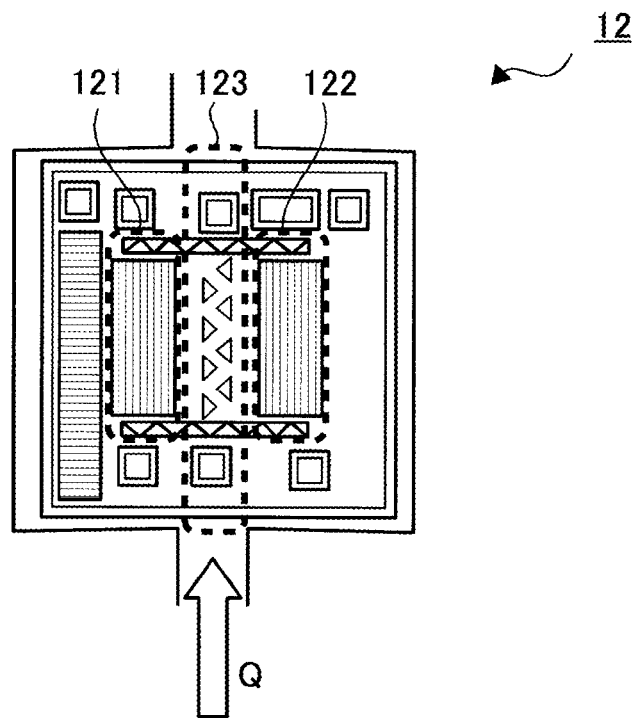
FIG. 15A is a schematic diagram illustrating a physical property sensor.
Figure 15B:
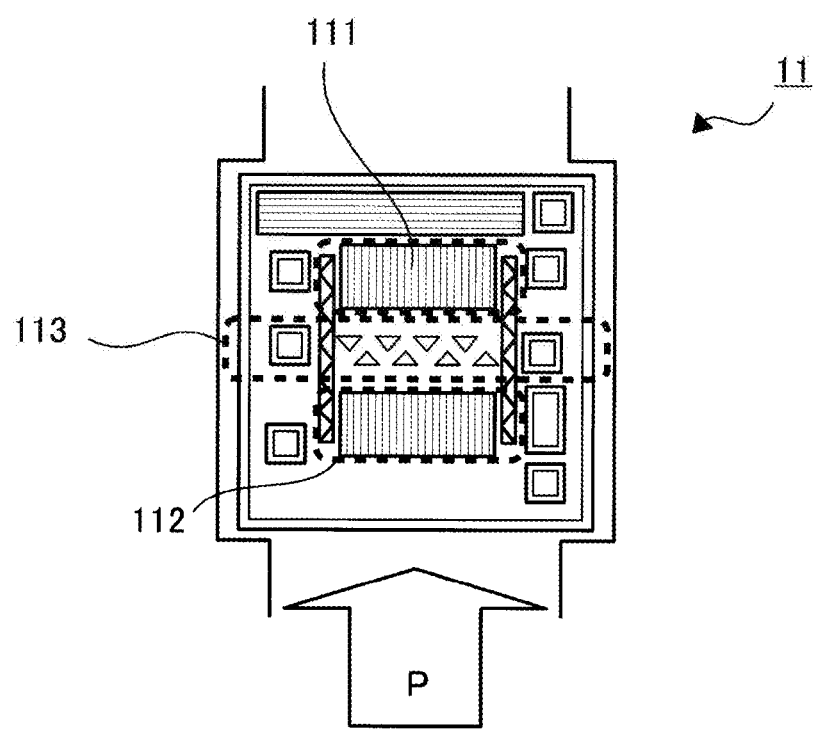
FIG. 15B is a schematic diagram of a flow sensor.

FIG. 15A is a schematic top view of the physical property sensor 12 shown in FIG. 13. FIG. 15B is a schematic top view of the flow sensor 11 shown in FIG. 13. In the flow measurement device 1 shown in FIGS. 15A and 15B, the physical property sensing channel 32 and the flow sensing channel 33 have longitudinally extending channel portions with different widths. The channel portion of the physical property sensing channel 32 containing the physical property sensor 12 have a smaller width than the channel portion of the flow sensing channel 33 containing the flow sensor 11. This structure allows individual control of the flow rates of the measurement target fluid branching to the physical property sensing channel 32 and the flow sensing channel 33 in the flow measurement device 1.

Figure 16:
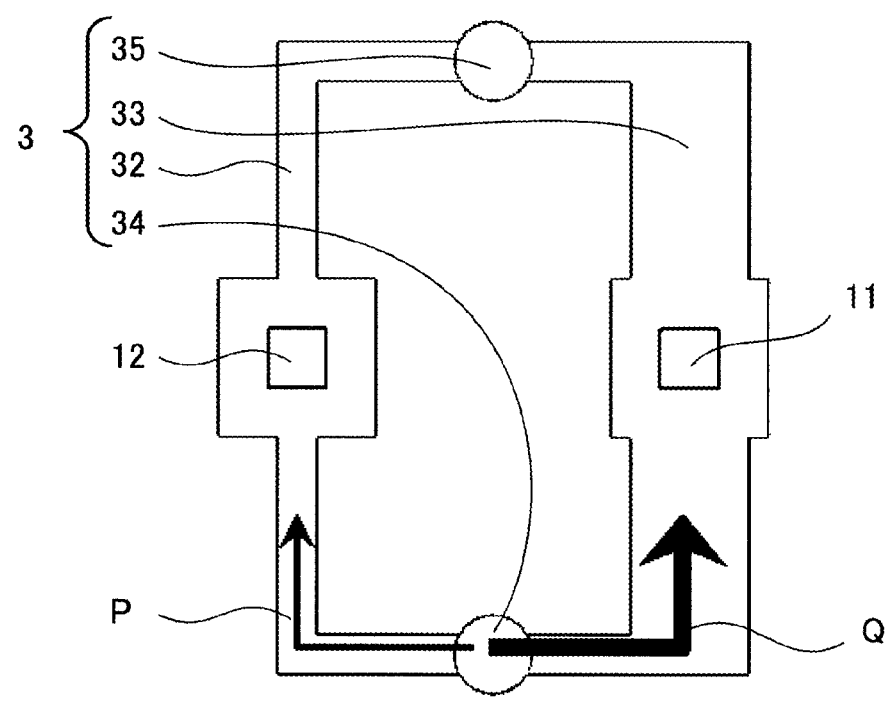
FIG. 16 is a schematic diagram illustrating the flow rate of a measurement target fluid branching to a physical property sensing channel and to a flow sensing channel.

FIG. 16 is a schematic diagram describing the flow rates of the measurement target fluid branching to the physical property sensing channel 32 and to the flow sensing channel 33 shown in FIG. 13. In one or more embodiments, as shown in FIG. 16, the physical property sensing channel 32 has a width that allows a branched portion of the target fluid to flow at flow rate P, whereas the flow sensing channel 33 has a width that allows a branched portion of the target fluid to flow at flow rate Q.

Flow rate P and flow rate Q vary depending on the flow rate of the measurement target fluid flowing through the main channel section 2. However, in normal use, the width of the physical property sensing channel 32 is determined to regulate flow rate P within the sensing range of the physical property sensor 12, whereas the width of the flow sensing channel 33 is determined to regulate flow rate Q within the sensing range of the flow sensor 11.

In one or more embodiments, the physical property sensing channel 32 has a width of about 0.4 mm, and the flow sensing channel 33 has a width of about 0.8 mm.

In this manner, the flow measurement device 1 enables individual control of the flow rates of the measurement target fluid branching to the physical property sensing channel 32 and to the flow sensing channel 33 by adjusting the width of each channel. Thus, the flow rate of the measurement target fluid flowing through the physical property sensing channel 32 can be controlled within the sensing range of the physical property sensor 12, and the flow rate of the measurement target fluid flowing through the flow sensing channel 33 can be controlled within the sensing range of the flow sensor 11.

Thus, the physical property sensor 12, which can sense a physical property of the measurement target fluid at the optimum flow rate within its specific sensing range, has higher sensing accuracy.

Similarly, the flow sensor 11, which can sense the flow rate of the measurement target fluid at the optimum flow rate within its specific sensing range, has higher sensing accuracy.

In this modification, each of the physical property sensing channel 32 and the flow sensing channel 33 is substantially squared U-shaped as shown in FIG. 16. However, the present invention is not limited to this example. The physical property sensing channel 32 and the flow sensing channel 33 may each have any shape having a width that enables control of the flow rate of the measurement target fluid flowing through the physical property sensing channel 32 and the flow sensing channel 33.

FIGS. 17A to 17D are top views each showing a physical property sensing channel 32 and a flow sensing channel 33 according to modifications formed on the top surface of the sub-channel section 3 shown in FIG. 16.

Figure 17A:
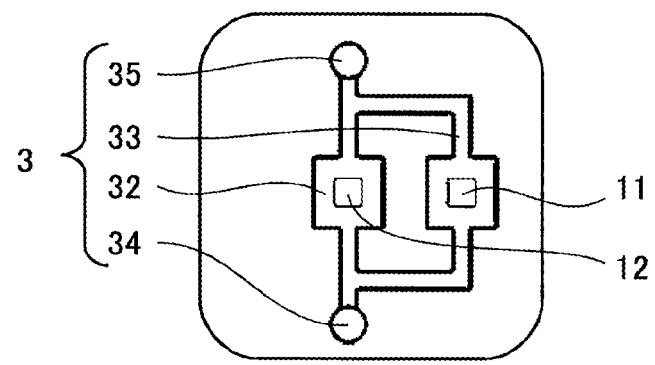
FIGS. 17A to 17D are top views illustrating a physical property sensing channel and a flow sensing channel according to modifications formed on the top surface of a sub-channel section.

As shown in FIG. 17A, for example, the physical property sensing channel 32 may be linear, and the flow sensing channel 33 may be substantially squared U-shaped.

Figure 17B:
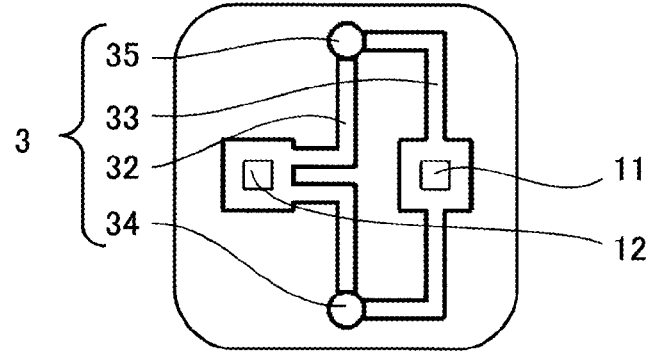
Figure 17C:
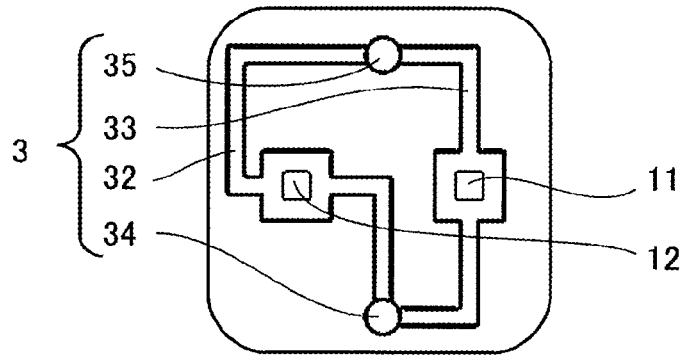
Figure 17D:
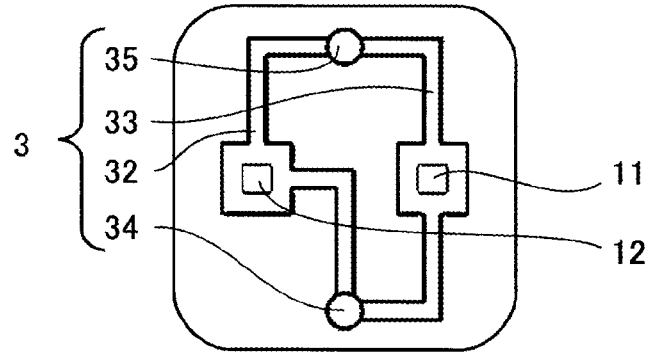

As shown in FIGS. 17B to 17D, the physical property sensing channel 32 may be formed to receive a measurement target fluid flowing in the direction orthogonal to the flow direction of the measurement target fluid into the flow sensing channel 33.

In these cases, the physical property sensor 12 and the flow sensor 11 may have the same orientation. This simplifies the process of mounting the physical property sensor 12 and the flow sensor 11 on the circuit board 5 in the manufacturing processes for the flow measurement device 1.

In this modification, as shown in FIG. 15A, the physical property sensor 12 includes the physical-property-sensor heater 123 for heating a measurement target fluid, and the physical-property-sensor first temperature sensor 121 and the physical-property-sensor second temperature sensor 122 for sensing the temperature of the measurement target fluid. The physical-property-sensor first temperature sensor 121 and the physical-property-sensor second temperature sensor 122 are symmetric with respect to the physical-property-sensor heater 123. However, the present invention is not limited to this structure.

Figure 18:
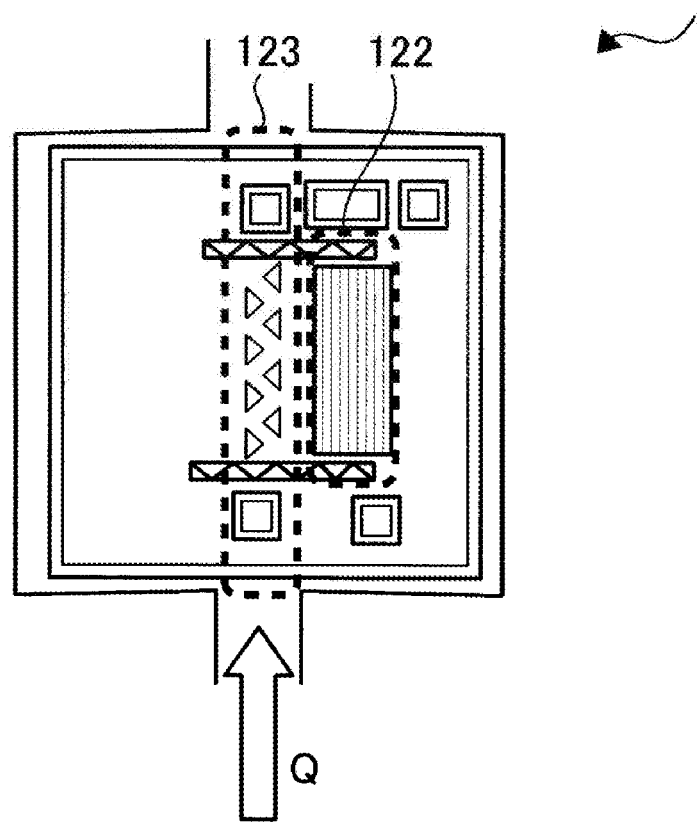
FIG. 18 is a schematic top view illustrating a physical property sensor according to a modification.

FIG. 18 is a schematic top view of a physical property sensor 12 according to a modification of the structure shown in FIG. 15A. As shown in FIG. 18, the physical-property-sensor heater 123 and the physical-property-sensor first temperature sensor 121 may form a physical property sensor 12a without the physical-property-sensor first temperature sensor 121.

In this manner, the physical-property-sensor heater and the physical-property-sensor first temperature sensor arranged parallel in the direction orthogonal to the flow direction of the measurement target fluid may form the physical property sensor 12a.

Second Modification

A flow measurement device according to another modification will now be described with reference to FIGS. 19A to 19C. The corresponding components as in the above one or more embodiments are given the corresponding reference numerals, and will not be described. The flow measurement device according to the present modification includes a flow sensor contained in the main channel.

Figure 19A:
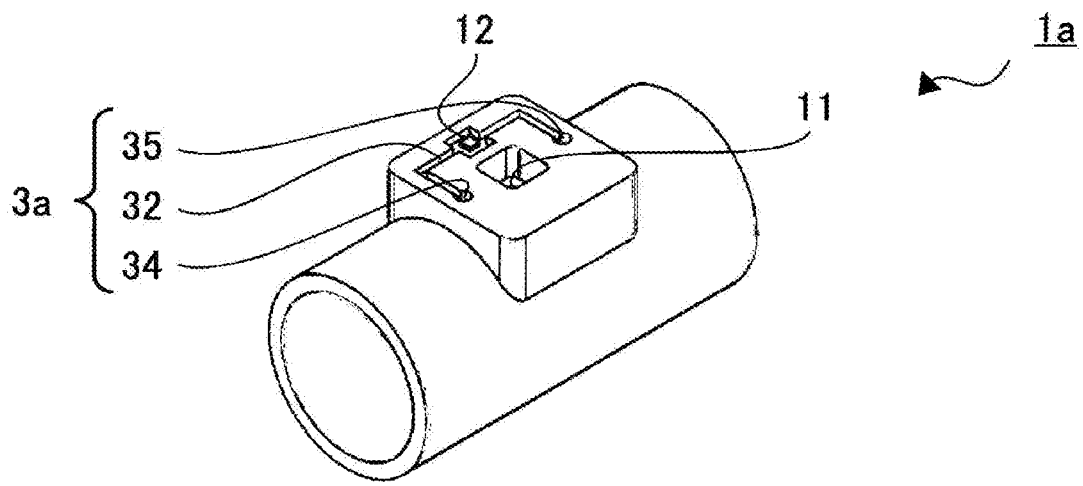
FIG. 19A is a perspective view illustrating a flow measurement device.

FIG. 19A is a perspective view of a flow measurement device 1a according to the present modification. FIG. 19B is a cross-sectional view of the flow measurement device 1a shown in FIG. 19A. FIG. 19C is a top view of a sub-channel section 3a shown in FIG. 19A.

Figure 19B:
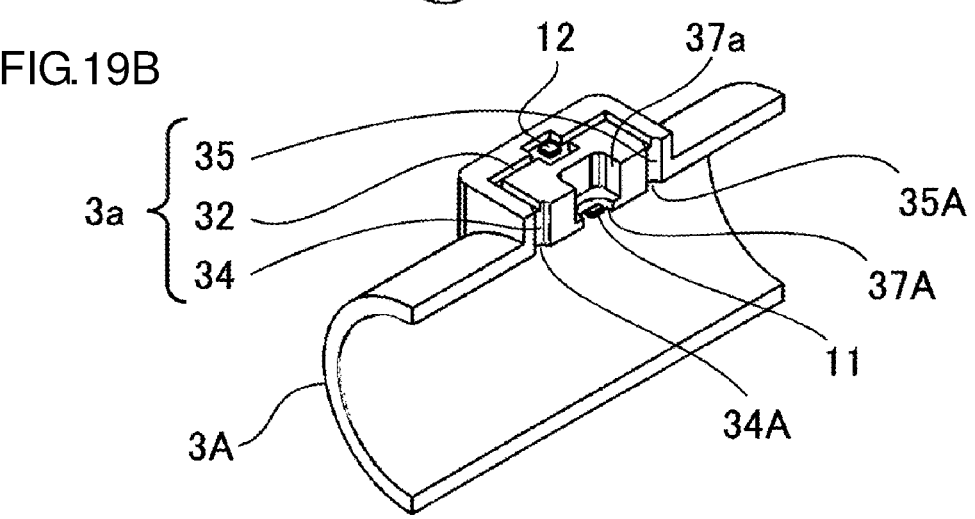
FIG. 19B is a cross-sectional view of a flow measurement device.
Figure 19C:
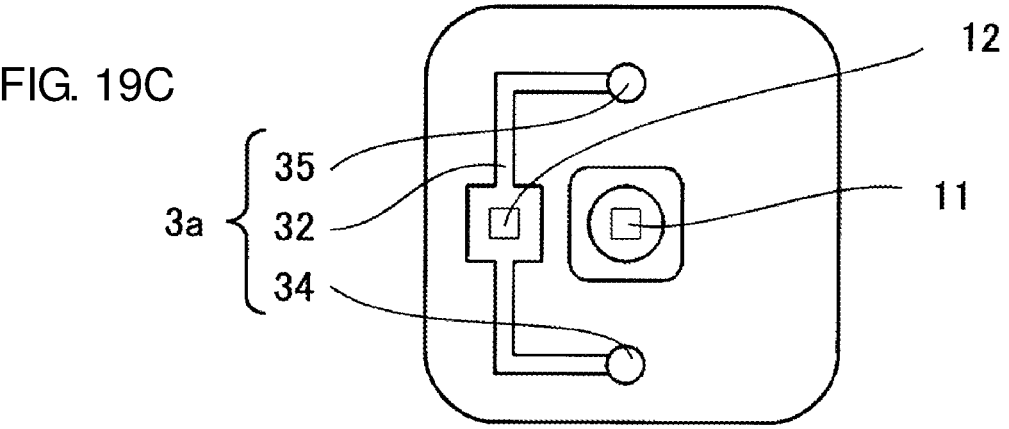
FIG. 19C is a top view of an auxiliary channel section.

As shown in FIGS. 19A to 19C, the flow measurement device 1a has an opening 37A between an inlet 34A and an outlet 35A in the inner surface of a main channel section 3A.

The sub-channel section 3a has a cellular flow sensing channel 37a containing a flow sensor 11. The flow sensing channel 37a is continuous with the opening 37A. The opening 37A allows a measurement target fluid flowing through the main channel section 2a to flow into the flow sensing channel 37a. The flow sensor 11 senses the flow rate of the measurement target fluid.

The size of the opening 37A may be adjusted to control the flow rate of the measurement target fluid flowing into the flow sensing channel 37a from the main channel section 2a.

The sub-channel section 3a includes an in-flow channel 34, a physical property sensing channel 32, and an out-flow channel 35. The physical property sensing channel 32 contains a physical property sensor 12 for sensing a physical property of the measurement target fluid in its longitudinally elongated part.

In this manner, the physical property sensor 12 is mounted on the sub-channel section 3a, and the flow sensor 11 is mounted on the main channel section 2a in the flow measurement device 1a. The flow measurement device 1a thus enables control of the flow rate within the sensing range of the physical property sensor 12.

Thus, the flow measurement device 1a in one or more embodiments reduces a change in the output characteristics caused by a change in the physical properties of a measurement target fluid, and measures the flow rate of the measurement target fluid with high accuracy.

Third Modification

A flow measurement device according to still another modification will now be described with reference to FIGS. 20A and 20B. The corresponding components as in one or more embodiments are given the corresponding reference numerals, and will not be described.

The flow measurement device according to the present modification differs from the flow measurement device described above in including two separate sub-channels.

Figure 20A:
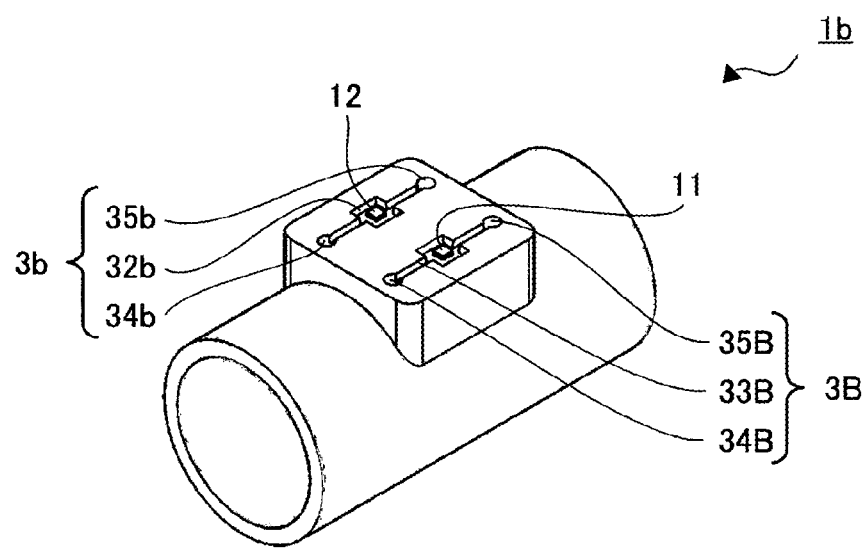
FIGS. 20A and 20B are diagrams illustrating a flow measurement device according to a modification.

FIG. 20A is a perspective view of a flow measurement device 1b according to one or more embodiments. FIG. 20B is a top view of sub-channel sections 3 shown in FIG. 20A.

Figure 20B:
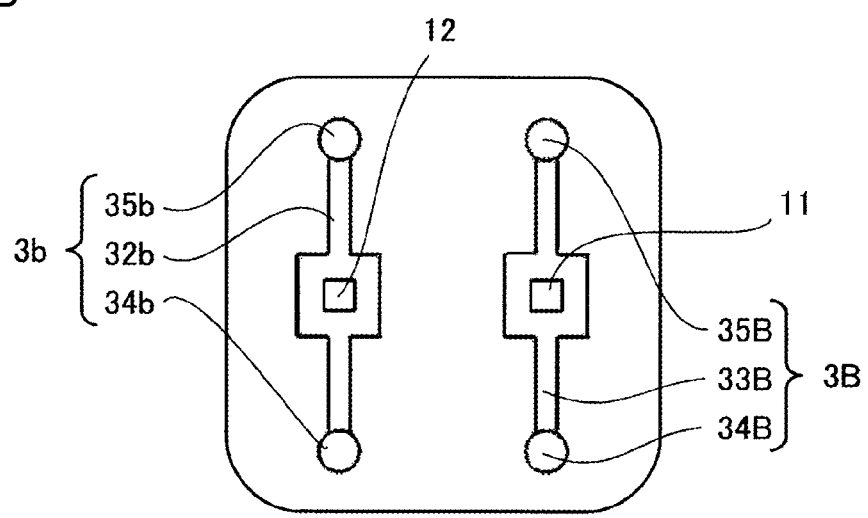

As shown in FIGS. 20A and 20B, the sub-channel sections 3 in the flow measurement device 1b include two sub-channel sections inside and on their top surfaces.

A first sub-channel section 3b includes an in-flow channel 34b, a physical property sensing channel 32b, and an out-flow channel 35b. The physical property sensing channel 32b contains a physical property sensor 12 for sensing a physical property of the measurement target fluid in its longitudinally elongated part.

A second sub-channel section 3B includes an in-flow channel 34B, a flow sensing channel 33B, and an out-flow channel 35B. The flow sensing channel 33B contains a flow sensor 11 for sensing the flow rate of the measurement target fluid in its longitudinally elongated part.

In this manner, the sub-channel sections 3 in the flow measurement device 1b include the two separate sub-channel sections, and the physical property sensor 12 is mounted on the first sub-channel section 3b, whereas the flow sensor 11 is mounted on the second sub-channel section 3B. The flow measurement device 1b thus enables individual control of the flow rates within the sensing ranges of the physical property sensor 12 and the flow sensor 11.

Thus, the flow measurement device 1b in one or more embodiments reduces a change in the output characteristics caused by a change in the physical properties of a measurement target fluid, and measures the flow rate of the measurement target fluid with high accuracy.

Fourth Modification

A flow measurement device according to still another modification will now be described with reference to FIGS. 21A to 21C. The corresponding components as in one or more embodiments are given the corresponding reference numerals, and will not be described.

The flow measurement device according to the present modification differs from the flow measurement device described above in that a physical property sensing channel is defined in a flow sensing channel.

Figure 21A:
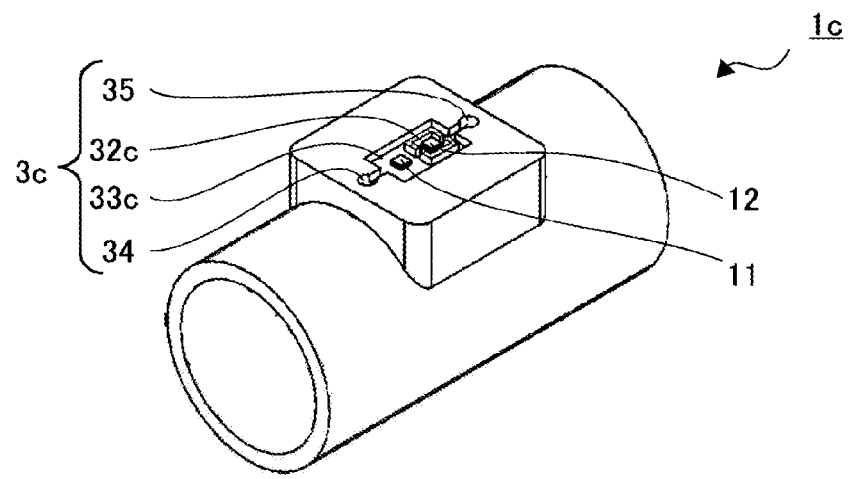
FIGS. 21A to 21C are diagrams illustrating a flow measurement device according to a modification.

FIG. 21A is a perspective view of a flow measurement device 1c according to one or more embodiments. FIG. 21B is a perspective view of a sub-channel section 3c shown in FIG. 21A. FIG. 21C is a top view of the sub-channel section 3c shown in FIG. 21A.

Figure 21B:
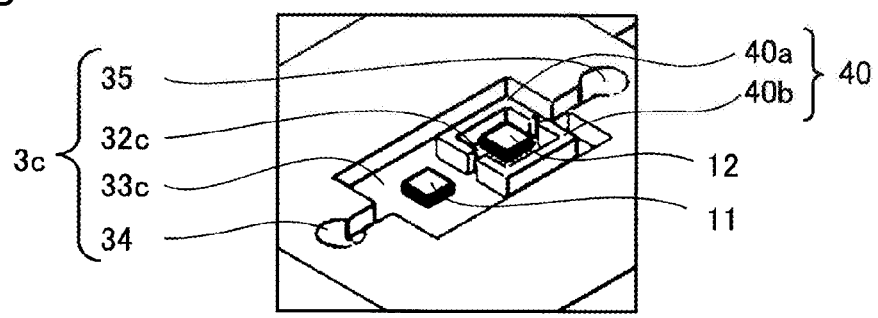
Figure 21C:
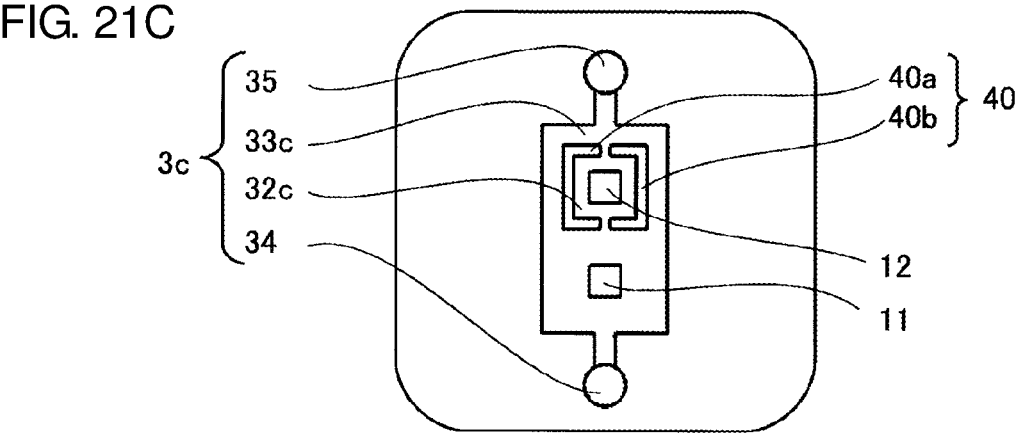

As shown in FIGS. 21A to 21C, the sub-channel section 3c in the flow measurement device 1c includes an in-flow channel 34, a physical property sensing channel 32c, a flow sensing channel 33c, and an out-flow channel 35.

In the sub-channel section 3c, the physical property sensing channel 32c is defined in the flow sensing channel 33c. A flow sensor 11 is mounted upstream in the flow direction of the measurement target fluid, and a physical property sensor 12 is mounted downstream.

The physical property sensing channel 32c is separated from the flow sensing channel 33c by a flow rate control member 40 for controlling the flow rate of a measurement target fluid. The physical property sensor 12 is located inside the flow rate control member 40.

The flow rate control member 40 controls the flow rate of a measurement target fluid flowing through the physical property sensing channel 32c, and includes a first side wall 40a and a second side wall 40b. The first side wall 40a and the second side wall 40b, each of which is substantially squared U-shaped, and flat, face each other with a predetermined space between opposite ends of the walls.

The space between the first side wall 40a and the second side wall 40b may be controlled to adjust the flow rate of a measurement target fluid flowing inside the flow rate control member 40, or through the physical property sensing channel 32c.

In the flow measurement device 1c, the sub-channel section 3c has the flow rate control member 40, which contains the physical property sensing channel 32c. Thus, the physical property sensing channel 32c may be formed at any position in the sub-channel section 3c. The flow rate control member 40 also enables easy control of the flow rate of a measurement target fluid flowing through the physical property sensing channel 32c.

In this manner, the structure with the physical property sensing channel 32c defined inside the flow sensing channel 33c enables individual control of the flow rates within the sensing ranges of the physical property sensor 12 and the flow sensor 11.

Thus, the flow measurement device 1c in one or more embodiments reduces a change in the output characteristics caused by a change in the physical properties of a measurement target fluid, and measures the flow rate of the measurement target fluid with high accuracy.

Fifth Modification

Figure 22A:
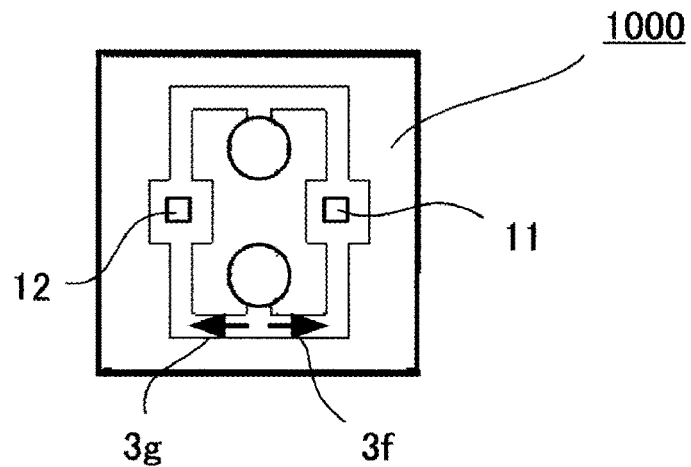
FIGS. 22A to 22C are diagrams illustrating multiple branches according to a modification.
Figure 22B:
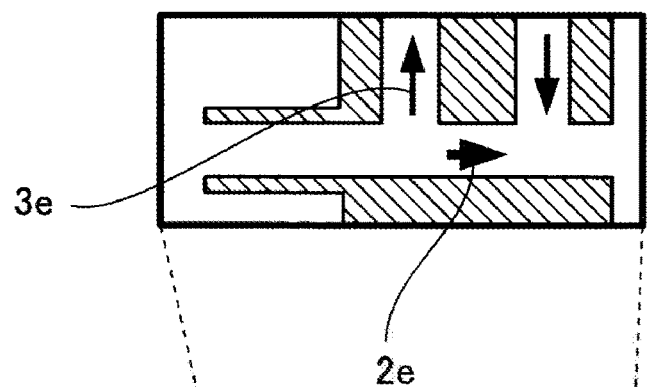
Figure 22C:
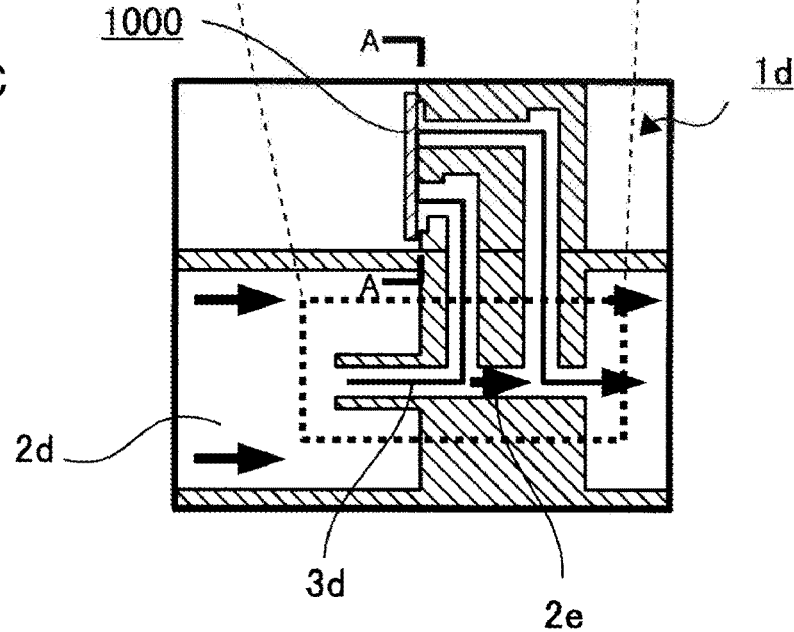

FIGS. 22A to 22C are diagrams describing multiple branches according to another modification. FIG. 22C shows the connection between a main channel section 2d and a flow measurement device 1d. FIG. 22B is an enlarged view of the part indicated by a dashed rectangle in FIG. 22C. FIG. 22A is a cross-sectional view taken along line A-A of a unit 1000 in FIG. 22C. As shown in the enlarged view of FIG. 22B, the main channel section 2d has a sub-channel section 3d that is elongated in the flow direction and is thinner (having a cross-sectional area smaller) than the main channel section 2d in the present modification. The sub-channel section 3d branches into a main channel section 2e extending through along the main channel section 2d and a sub-channel section 3e substantially perpendicularly continuous with the sub-channel section 3d. As shown in FIG. 22A, the sub-channel section 3e branches into a sub-channel section 3f having a flow sensor 11 and a sub-channel section 3g having a physical property sensor 12.

The modifications with the sub-channels described above enable a small flow measurement device 1d to measure the flow rate independently of the flow rate in the main channel section 2d (specifically, the thickness, or the cross-sectional area, of the main channel section 2d). The modifications with the sub-channels described above reduce dust entering the sensor chip, and achieve increased measurement accuracy. Additionally, the triple branching structure according to the modification shown in FIGS. 22A to 22C further reduces the entering dust.

As in the unit 1000 shown in FIGS. 22A to 22C, for example, a part with a sub-channel section 3f having the flow sensor 11 and a sub-channel section 3g having the physical property sensor 12 may be formed as a removable component. This provides components mountable to main channel sections 2 with various flow rates and shapes, and reduces the costs.

Figure 23:
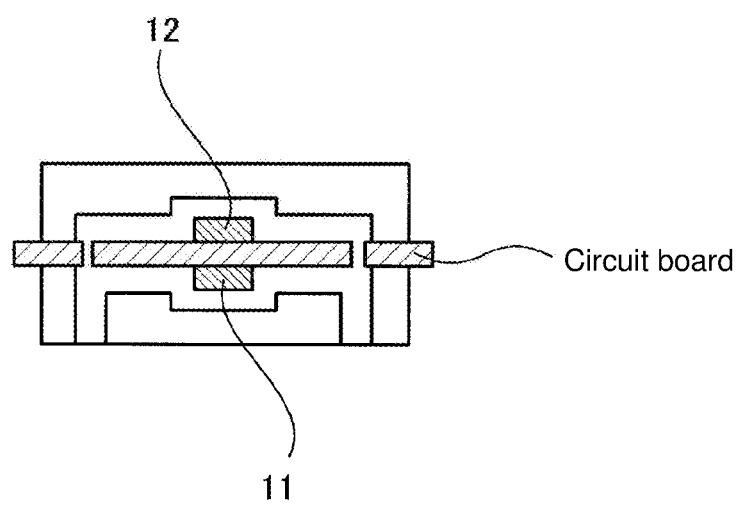
FIG. 23 is a cross-sectional view illustrating a modification.

FIG. 23 is a cross-sectional view describing another modification. In the example shown in FIG. 23, a flow sensor 11 is mounted on one side of a circuit board, and a physical property sensor 12 is on the other side. A sub-channel is formed through the circuit board. The structure may not have a tubular sub-channel, and the branching structure as shown in FIG. 23 may be used.

REFERENCE SIGNS LIST 1 flow measurement device
2 main channel section
3 sub-channel section
5 circuit board
11 flow sensor
111 flow-sensor first temperature sensor
112 flow-sensor second temperature sensor
113 microheater
12 physical property sensor
121 physical-property-sensor first temperature sensor
122 physical-property-sensor second temperature sensor
123 physical-property-sensor heater
13 control unit
131 correction processor
132 characteristic-value calculator
32 physical property sensing channel
33 flow sensing channel
34 in-flow channel
100 sensor element
101 heater
102 thermopile
1000 unit

The invention claimed is:

1. A flow measurement device, comprising:
a thermal flow sensor configured to sense a flow rate of a measurement target fluid flowing through a main channel;
a characteristic-value obtaining unit including a heater configured to heat the measurement target fluid and a temperature sensor configured to sense a temperature of the measurement target fluid, the characteristic-value obtaining unit being configured to obtain a characteristic value of the measurement target fluid, wherein the characteristic value comprises a ratio of an output value of the temperature sensor obtained by flowing a predetermined gas to an output value of the temperature sensor obtained by flowing a reference gas, and the characteristic value indicates a thermal diffusivity of the measurement target fluid;
a flow rate correction unit configured to correct a flow rate of the measurement target fluid calculated based on a sensing signal output from the thermal flow sensor using the characteristic value of the measurement target fluid obtained by the characteristic-value obtaining unit, and
a sub-channel section branching from the main channel and having one end continuous with a first inlet opening in the main channel and another end continuous with a first outlet opening in the main channel, the sub-channel section including a characteristic-value sensing channel containing the temperature sensor included in the characteristic-value obtaining unit and a flow sensing channel containing the thermal flow sensor, wherein the heater and the temperature sensor are arranged parallel to each other in a direction orthogonal to a flow direction of the measurement target fluid, the characteristic-value obtaining unit obtains the characteristic value based on a difference between the temperatures of the measurement target fluid sensed by the temperature sensor before and after a temperature of the heater is changed and the flow sensing channel and the characteristic-value sensing channel are defined by the sub-channel section separated by a circuit board located in parallel with the flow direction of the measurement target fluid in the sub-channel section, and the thermal flow sensor is located on a first surface of the circuit board and the temperature sensor included in the characteristic-value obtaining unit is located on a second surface of the circuit board opposite to the first surface.

2. The flow measurement device according to claim 1, wherein the characteristic value is a value obtained by multiplying a predetermined coefficient by the difference between the temperatures of the measurement target fluid sensed by the temperature sensor before and after the temperature of the heater is changed, and the flow rate correction unit multiplies the characteristic value by the sensing signal output from the thermal flow sensor to correct the flow rate of the measurement target fluid.

3. The flow measurement device according to claim 1, wherein the temperature sensor included in the characteristic-value obtaining unit and the thermal flow sensor are included in a flow sensing member that is removably mounted on the main channel or a member defining the sub-channel section.

4. The flow measurement device according to claim 1, wherein the sub-channel section includes a flow sensing channel containing the thermal flow sensor, a first sub-channel section branching from the sub-channel section and having one end continuous with a first inlet opening in the main channel and another end continuous with a first outlet opening in the main channel, and a second sub-channel section branching from the first sub-channel section and having one end continuous with a second inlet opening in the first sub-channel section and another end continuous with a second outlet opening in the first sub-channel section, and each of the flow sensing channel and the characteristic-value sensing channel further branches from the second sub-channel section and has one end continuous with a third inlet opening in the second sub-channel section and another end continuous with a third outlet opening in the second sub-channel section.

5. The flow measurement device according to claim 1, wherein the sub-channel section further includes a flow sensing channel containing the thermal flow sensor, the flow sensing channel has one end continuous with the first inlet and another end continuous with the first outlet, and the device allows the measurement target fluid flowing in through the first inlet to branch to the characteristic-value sensing channel and to the flow sensing channel.

6. The flow measurement device according to claim 1, wherein the sub-channel section further includes a flow sensing channel containing the thermal flow sensor, the characteristic-value sensing channel is located in the flow sensing channel, and the device allows part of the measurement target fluid flowing through the flow sensing channel to flow into the characteristic-value sensing channel.

7. The flow measurement device according to claim 1, wherein the sub-channel section further includes a flow sensing channel containing the thermal flow sensor, and the flow sensing channel has one end continuous with a fourth inlet opening in the main channel and another end continuous with a fourth outlet opening in the main channel.

8. The flow measurement device according to claim 1, wherein the thermal flow sensor is located in the main channel.

9. The flow measurement device according to claim 1, wherein the heater is located to have a longitudinal direction in the flow direction of the measurement target fluid.

10. The flow measurement device according to claim 1, wherein the temperature sensor is located to have a longitudinal direction in the flow direction of the measurement target fluid.

11. The flow measurement device according to claim 2, further comprising:

a sub-channel section branching from the main channel and having one end continuous with a first inlet opening in the main channel and another end continuous with a first outlet opening in the main channel, the sub-channel section including a characteristic-value sensing channel containing the temperature sensor included in the characteristic-value obtaining unit, wherein the thermal flow sensor is located at a position different from the characteristic-value sensing channel.

12. The flow measurement device according to claim 11, wherein the temperature sensor included in the characteristic-value obtaining unit and the thermal flow sensor are included in a flow sensing member that is removably mounted on the main channel or a member defining the sub-channel section.

13. A method for measuring a flow rate of a measurement target fluid, the method being implemented by a flow measurement device including a thermal flow sensor configured to sense the flow rate of the measurement target fluid flowing through a main channel, the thermal flow sensor including a heater configured to heat the measurement target fluid and a temperature sensor configured to sense a temperature of the measurement target fluid, the heater and the temperature sensor being arranged parallel to each other in a flow direction of the measurement target fluid;

a characteristic-value obtaining unit configured to obtain a characteristic value of the measurement target fluid, the characteristic-value obtaining unit including a second heater configured to heat the measurement target fluid and a second temperature sensor configured to sense a temperature of the measurement target fluid, the second heater and the second temperature sensor being arranged parallel to each other in a direction orthogonal to a flow of the measurement target fluid, wherein the characteristic value is a ratio of an output value of the second temperature sensor obtained by flowing a predetermined gas to an output value of the second temperature sensor obtained by flowing a reference gas, and the characteristic value indicating a thermal diffusivity of the measurement target fluid, and a sub-channel section branching from the main channel and having one end continuous with a first inlet opening in the main channel and another end continuous with a first outlet opening in the main channel, the sub-channel section including a characteristic-value sensing channel containing the temperature sensor included in the characteristic-value obtaining unit and a flow sensing channel containing the thermal flow sensor, wherein the flow sensing channel and the characteristic-value sensing channel are defined by the sub-channel section separated by a circuit board located in parallel with the flow direction of the measurement target fluid in the sub-channel section, and the thermal flow sensor is located on a first surface of the circuit board and the temperature sensor included in the characteristic-value obtaining unit is located on a second surface of the circuit board opposite to the first surface the method comprising:

sensing, performed by the thermal flow sensor, the flow rate of the measurement target fluid flowing through the main channel;

measuring, performed by the second temperature sensor, a first temperature of the measurement target fluid;

changing a temperature of the second heater;

measuring, performed by the second temperature sensor, a second temperature of the measurement target fluid after changing the temperature;

obtaining the characteristic value based on a difference between the measured first temperature of the measurement target fluid and the measured second temperature of the measurement target fluid; and correcting the flow rate of the measurement target fluid by multiplying the characteristic value by the flow rate of the measurement target fluid sensed in sensing the flow rate.

14. A non-transitory computer-readable storage medium storing a program causing a flow measurement device to measure a flow rate of a measurement target fluid, the flow measurement device including:

a thermal flow sensor configured to sense the flow rate of the measurement target fluid flowing through a main channel, the thermal flow sensor including a heater configured to heat the measurement target fluid and a temperature sensor configured to sense a temperature of the measurement target fluid, the heater and the temperature sensor being arranged parallel to each other in a flow direction of the measurement target fluid;

a characteristic-value obtaining unit configured to obtain a characteristic value of the measurement target fluid, the characteristic-value obtaining unit including a second heater configured to heat the measurement target fluid and a second temperature sensor configured to sense a temperature of the measurement target fluid, the second heater and the second temperature sensor being arranged parallel to each other in a direction orthogonal to a flow of the measurement target fluid, wherein the characteristic value is a ratio of an output value of the second temperature sensor obtained by flowing a predetermined gas to an output value of the second temperature sensor obtained by flowing a reference gas, and the characteristic value indicating a thermal diffusivity of the measurement target fluid, and a sub-channel section branching from the main channel and having one end continuous with a first inlet opening in the main channel and another end continuous with a first outlet opening in the main channel, the sub-channel section including a characteristic-value sensing channel containing the temperature sensor included in the characteristic-value obtaining unit and a flow sensing channel containing the thermal flow sensor, wherein the flow sensing channel and the characteristic-value sensing channel are defined by the sub-channel section separated by a circuit board located in parallel with the flow direction of the measurement target fluid in the sub-channel section, and the thermal flow sensor is located on a first surface of the circuit board and the temperature sensor included in the characteristic-value obtaining unit is located on a second surface of the circuit board opposite to the first surface the program causing an information processing device to perform operations comprising:

sensing, performed by the thermal flow sensor, the flow rate of the measurement target fluid flowing through the main channel;

measuring, performed by the second temperature sensor, a first temperature of the measurement target fluid;

changing a temperature of the second heater;

measuring, performed by the second temperature sensor, a second temperature of the measurement target fluid after changing the temperature;

obtaining the characteristic value based on a difference between the measured first temperature of the measurement target fluid and the measured second temperature of the measurement target fluid; and correcting the flow rate of the measurement target fluid by multiplying the characteristic value by the flow rate of the measurement target fluid sensed in sensing the flow rate.

* * * * *